(12) United States Patent
Okubo et al.

(10) Patent No.: US 9,825,773 B2
(45) Date of Patent: Nov. 21, 2017

(54) DEVICE CONTROL BY SPEECH COMMANDS WITH MICROPHONE AND CAMERA TO ACQUIRE LINE-OF-SIGHT INFORMATION

(71) Applicant: Panasonic Intellectual Property Corporation of America, Torrance, CA (US)

(72) Inventors: Masafumi Okubo, Kyoto (JP); Keiichi Tanaka, Osaka (JP); Tomonori Nakamura, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/174,933

(22) Filed: Jun. 6, 2016

(65) Prior Publication Data
US 2016/0373269 A1 Dec. 22, 2016

(30) Foreign Application Priority Data
Jun. 18, 2015 (JP) .................................. 2015-123322

(51) Int. Cl.
*G10L 15/24* (2013.01)
*H04L 12/28* (2006.01)
(Continued)

(52) U.S. Cl.
CPC ............ *H04L 12/282* (2013.01); *G06F 3/013* (2013.01); *G06F 3/167* (2013.01); *G10L 15/22* (2013.01);
(Continued)

(58) Field of Classification Search
CPC . G06F 3/012; G06F 3/013; G06F 3/16; G10L 15/24; G10L 15/25;
(Continued)

(56) References Cited

U.S. PATENT DOCUMENTS 6,351,698 B1 * 2/2002 Kubota .................. G10L 15/26
340/988
6,654,720 B1 * 11/2003 Graham .................... G06F 3/16
704/270
(Continued)

FOREIGN PATENT DOCUMENTS

| JP | 2007-121576 | 5/2007 |
| JP | 2013-080015 | 5/2013 |
| JP | 2014-153663 | 8/2014 |

*Primary Examiner* — Martin Lerner
(74) *Attorney, Agent, or Firm* — Greenblum & Bernstein, P.L.C.

(57) ABSTRACT

A first device is installed at a first location in a first space visible to a user. A second device is installed at a second location in a second space not visible to the user. A device control method acquires line-of-sight information indicating a line-of-sight direction of the user from a camera. The line-of-sight direction of the user is determined based on the line-of-sight information. In a case where the line-of-sight direction indicates a third location other than the first location, the second device is identified as an object of control. Sound data indicating speech of the user is acquired from a microphone, a control command corresponding to the sound data is generated, and the control command is transmitted to the object of control.

19 Claims, 30 Drawing Sheets

(51) Int. Cl.
*G06F 3/01* (2006.01)
*G10L 15/22* (2006.01)
*G06F 3/16* (2006.01)

(52) U.S. Cl.
CPC ........ *G10L 15/24* (2013.01); *G10L 2015/223* (2013.01); *G10L 2015/228* (2013.01); *H04L 2012/285* (2013.01)

(58) Field of Classification Search
CPC ......... G10L 2015/226; G10L 2015/227; G10L 25/48; G10L 25/57; H04L 12/282
USPC ............. 704/231, 235, 236, 270, 275, 270.1
See application file for complete search history.

(56) References Cited

U.S. PATENT DOCUMENTS

| | | | | |
|---|---|---|---|---|
| 6,970,824 B2* | 11/2005 | Hinde | ............... | G10L 15/24 704/275 |
| 7,203,642 B2* | 4/2007 | Ishii | ............... | G10L 15/26 704/272 |
| 8,340,975 B1* | 12/2012 | Rosenberger | ............... | G10L 15/22 704/270 |
| 9,418,653 B2* | 8/2016 | Sekiguchi | ............... | G10L 15/22 |
| 2001/0041982 A1* | 11/2001 | Kawasaki | ............... | G10L 15/26 704/275 |
| 2008/0059175 A1* | 3/2008 | Miyajima | ............... | G10L 15/25 704/246 |
| 2013/0085757 A1 | 4/2013 | Nakamura et al. | | |
| 2013/0304479 A1* | 11/2013 | Teller | ............... | G10L 15/22 704/275 |
| 2013/0307771 A1* | 11/2013 | Parker | ............... | G10L 15/22 345/158 |
| 2014/0122086 A1* | 5/2014 | Kapur | ............... | G06F 3/017 704/275 |
| 2014/0330560 A1* | 11/2014 | Venkatesha | ............... | G10L 15/22 704/235 |
| 2015/0109191 A1* | 4/2015 | Johnson | ............... | G10L 15/22 345/156 |
| 2015/0243287 A1* | 8/2015 | Nakano | ............... | G10L 15/30 704/246 |
| 2015/0331490 A1 | 11/2015 | Yamada | | |
| 2015/0340029 A1* | 11/2015 | Kunieda | ............... | G10L 15/25 704/249 |
| 2016/0035352 A1* | 2/2016 | Furumoto | ............... | G10L 15/22 704/276 |
| 2016/0063989 A1* | 3/2016 | Deleeuw | ............... | G10L 15/22 704/231 |
| 2016/0314782 A1* | 10/2016 | Klimanis | ............... | G10L 15/065 |
| 2016/0335051 A1* | 11/2016 | Osawa | ............... | G10L 15/22 |
| 2016/0378424 A1* | 12/2016 | Kanda | ............... | G06F 3/16 700/275 |

* cited by examiner

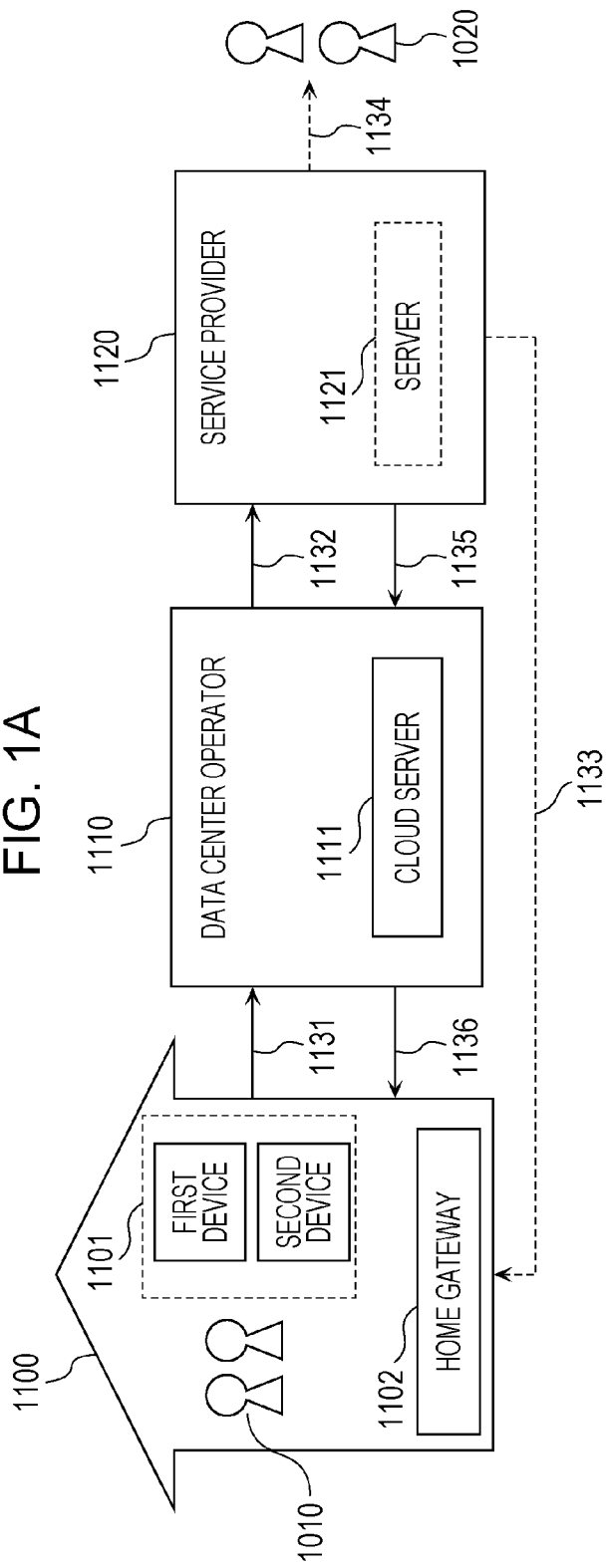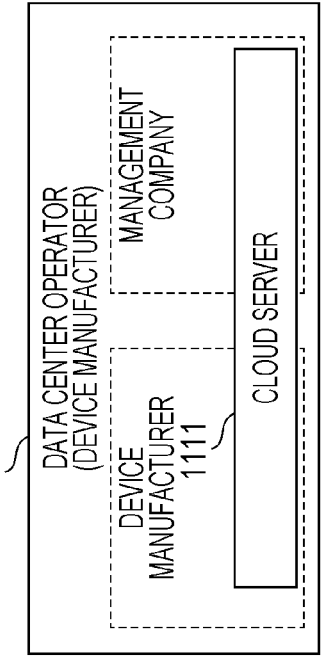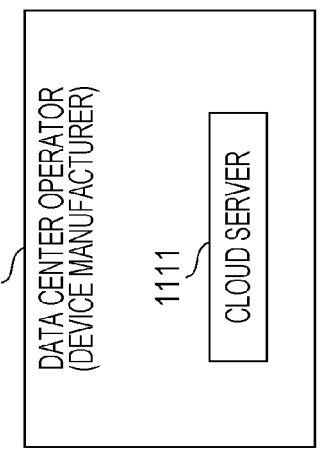

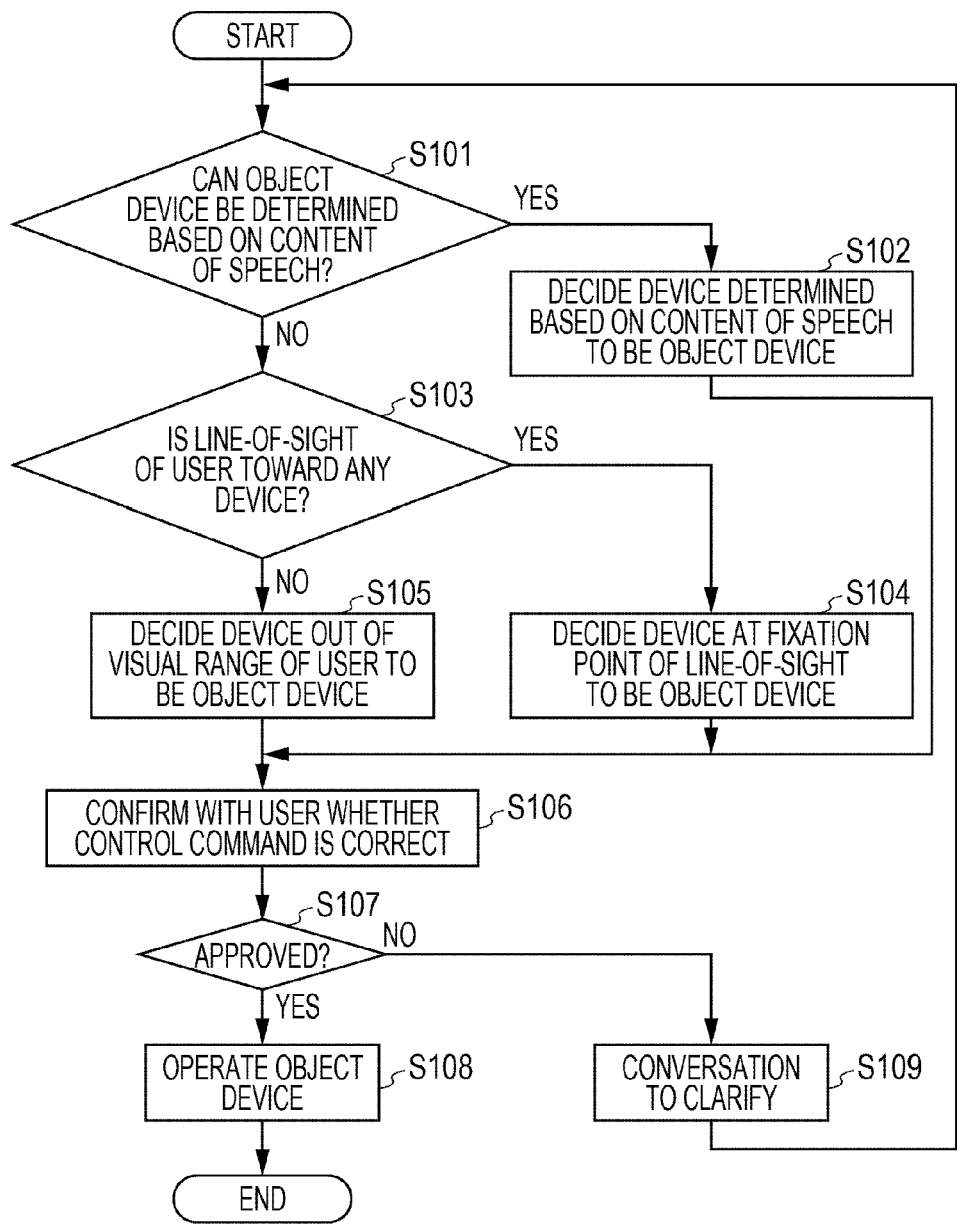

FIG. 4A

| DEVICE MANAGEMENT INFORMATION ||||||
|---|---|---|---|---|---|
| IDENTIFIER | ATTRIBUTE | TYPE | SOUND COLLECTION | INSTALLATION LOCATION | SPEECH |
| HOME GATEWAY | GATEWAY | MANAGEMENT AND OPERATION | – | FIRST SPACE | – |
| FIRST DEVICE | HOME APPLIANCE | AIR CONDITIONING | – | FIRST SPACE | – |
| SECOND DEVICE | HOME APPLIANCE | AIR CONDITIONING | – | SECOND SPACE | – |
| SOUND COLLECTION DEVICE | – | – | ○ | FIRST SPACE | ○ |

| CONVERSATION DICTIONARY ||||
|---|---|---|---|
| SPEECH RECOGNITION TEXT | ACTION |||
| | COMMAND | DEVICE | LOCATION |
| TURN ON LIVING ROOM LIGHT | power_on | LIGHTING | LIVING ROOM |
| TURN ON AIR CONDITIONER | power_on | AIR CONDITIONER | |
| TURN ON AIR COOLER | cooling_on | AIR CONDITIONER | |
| TURN ON POWER | power_on | | |
| MAKE IT WARMER | heating_on | | |
| ALL OFF | all_p_off | N/A | N/A |

2101

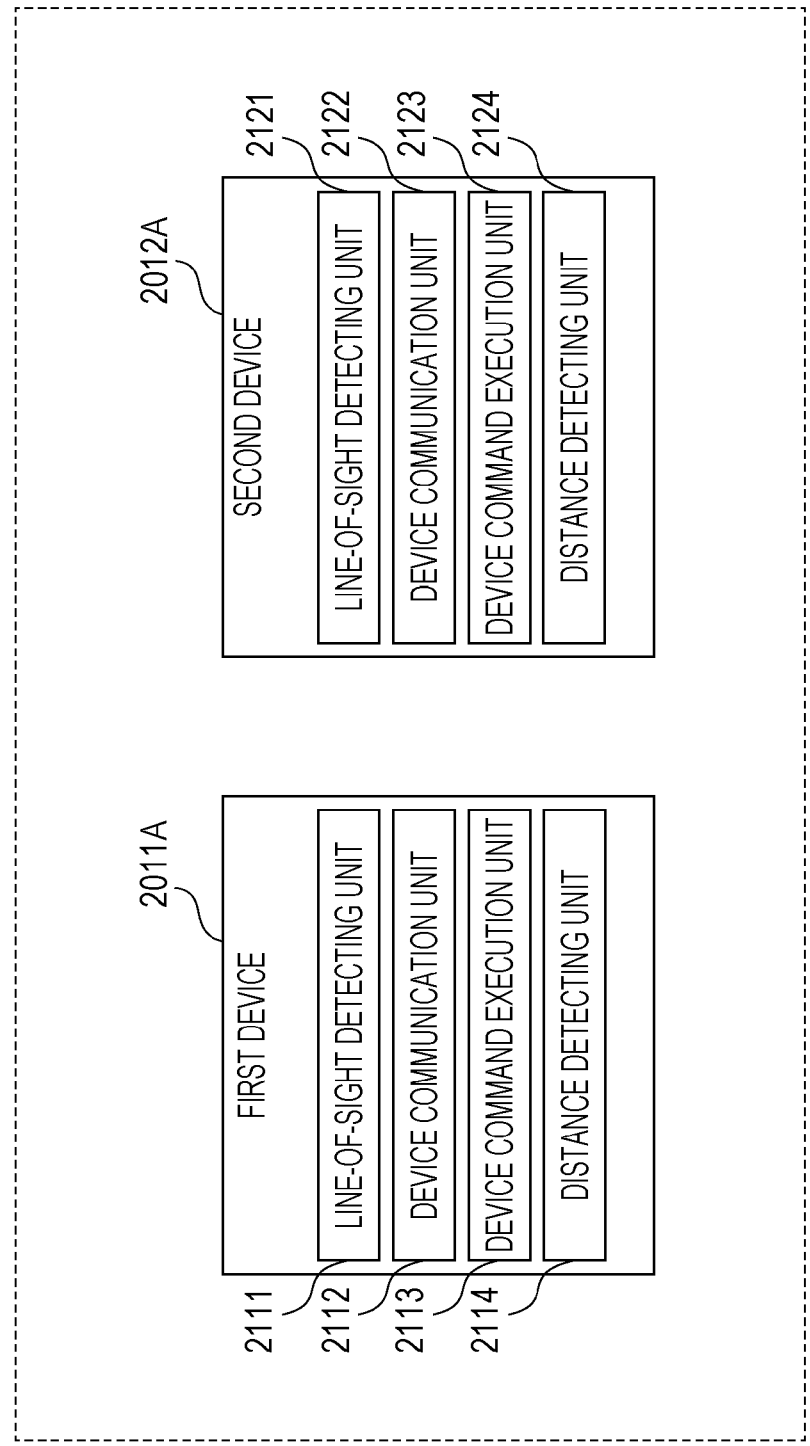

| DEVICE MANAGEMENT INFORMATION | | | | | | |
|---|---|---|---|---|---|---|
| IDENTIFIER | ATTRIBUTE | TYPE | SOUND COLLECTION | INSTALLATION LOCATION | SPEECH | DISTANCE |
| HOME GATEWAY | GATEWAY | MANAGEMENT AND OPERATION | – | LIVING ROOM | – | – |
| AIR CONDITIONER | HOME APPLIANCE | AIR CONDITIONING | – | LIVING ROOM | – | DETECTED |
| AIR CONDITIONER | HOME APPLIANCE | AIR CONDITIONING | – | BEDROOM | – | – |
| CEILING MICROPHONE | – | – | ○ | LIVING ROOM | ○ | – |

| DEVICE MANAGEMENT INFORMATION | | | | | | |
|---|---|---|---|---|---|---|
| IDENTIFIER | ATTRIBUTE | TYPE | SOUND COLLECTION | INSTALLATION LOCATION | SPEECH | DISTANCE |
| HOME GATEWAY | GATEWAY | MANAGEMENT AND OPERATION | – | – | – | – |
| AIR CONDITIONER | HOME APPLIANCE | AIR CONDITIONING | – | – | – | DETECTED |
| AIR CONDITIONER | HOME APPLIANCE | AIR CONDITIONING | – | – | – | – |
| CEILING MICROPHONE | – | – | ○ | – | ○ | – |

| DEVICE MANAGEMENT INFORMATION | | | | | | |
|---|---|---|---|---|---|---|
| IDENTIFIER | ATTRIBUTE | TYPE | SOUND COLLECTION | INSTALLATION LOCATION | SPEECH | DISTANCE |
| HOME GATEWAY | GATEWAY | MANAGEMENT AND OPERATION | – | LIVING ROOM | – | – |
| MICROWAVE OVEN | HOME APPLIANCE | COOKING AND HOUSEWORK | – | KITCHEN | – | DETECTED |
| AIR CONDITIONER | HOME APPLIANCE | AIR CONDITIONING | – | LIVING ROOM | – | – |
| SOUND COLLECTION MICROPHONE | – | – | ○ | KITCHEN | ○ | – |

FIG. 24

| IDENTIFIER | DEVICE MANAGEMENT INFORMATION ||||||| 2142D |
| | ATTRIBUTE | TYPE | SOUND COLLECTION | INSTALLATION LOCATION | SPEECH | DISTANCE | OWNER |
| --- | --- | --- | --- | --- | --- | --- | --- |
| HOME GATEWAY | GATEWAY | MANAGEMENT AND OPERATION | — | LIVING ROOM | — | — | — |
| AIR CONDITIONER | HOME APPLIANCE | AIR CONDITIONING | — | LIVING ROOM | — | DETECTED | — |
| AIR CONDITIONER | HOME APPLIANCE | AIR CONDITIONING | — | CHILDREN'S ROOM | — | — | CHILDREN |
| CEILING MICROPHONE | — | — | O | LIVING ROOM | — | — | — |
| WEARABLE MICROPHONE | — | — | O | — | O | — | CHILDREN |

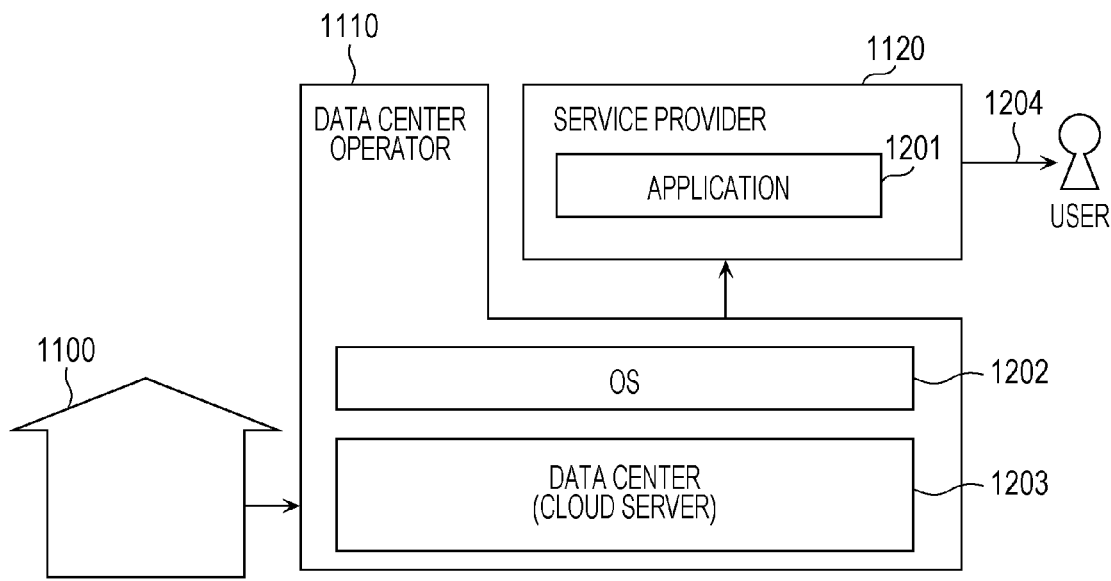
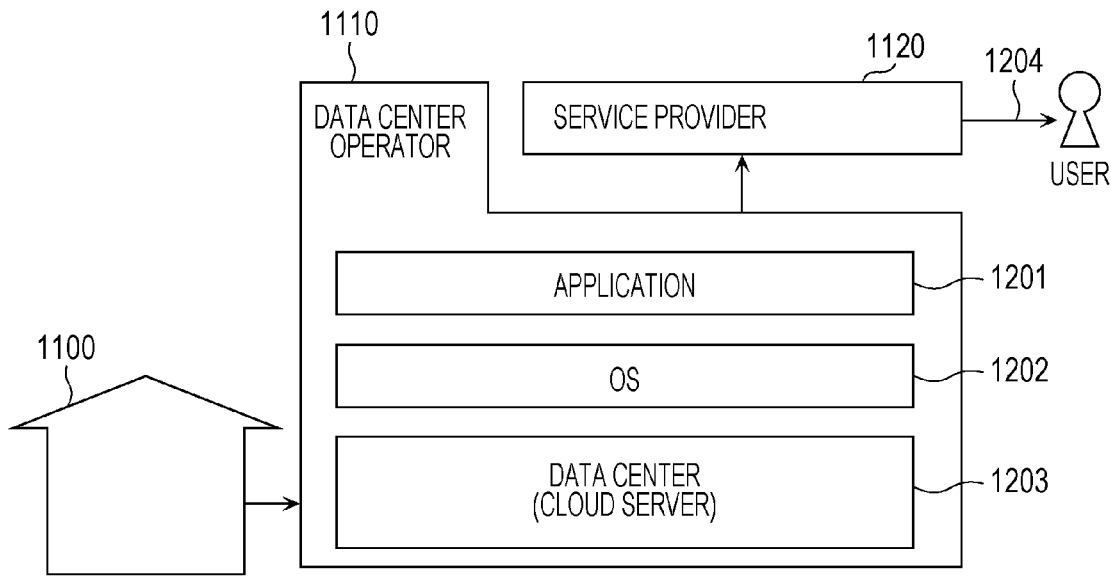

DEVICE CONTROL BY SPEECH COMMANDS WITH MICROPHONE AND CAMERA TO ACQUIRE LINE-OF-SIGHT INFORMATION

BACKGROUND

1. Technical Field

The present disclosure relates to a device control method and a controller that identify and control an object device to be controlled by a user, out of multiple devices.

2. Description of the Related Art

There are systems that perform state confirmation and operation of electronic devices in the home, using voice input. For example, the content of conversation of a person accrued by a portable microphone is transmitted to an electronic device such as a television set or the like in such a system. The electronic device analyzes the words that the user has spoken, and executes processing based on the speech. Thus, state confirmation and operation of electronic device is realized.

A device in Japanese Unexamined Patent Application Publication No. 2014-153663 analyzes two types of processing results, of image processing and audio processing, to identify a period from the start to end of speech of a user, and the direction of the sound source. Accordingly, ease-of-use of sound operation by the user can be improved, and erroneous recognition of words that the user has said can be reduced.

A device in Japanese Unexamined Patent Application Publication No. 2013-080015 uses multiple start triggers in accordance with the usage environment of a user, such as voice, clapping, gestures, and so forth, to identify the start of speech of the user. This improves ease-of-use of sound operation.

A device in Japanese Unexamined Patent Application Publication No. 2007-121576 performs voice recognition and device control by identifying a device from the movement of the hands or head of the user when controlling multiple electronic devices.

However, there has been demand for further improvement of the technology in Japanese Unexamined Patent Application Publication Nos. 2014-153663, 2013-080015, and 2007-121576.

SUMMARY

In one general aspect, the techniques disclosed here feature a device control method of a controller connected to a first device, a second device, a camera, and a microphone, the first device being installed at a first location in a first space, the second device being installed at a second location in a second space, the camera detecting a line-of-sight direction of a user, the microphone detecting speech of the user, the first space being visible to the user, and the second space not being visible to the user. The device control method includes: acquiring, from the camera, line-of-sight information indicating the line-of-sight direction of the user; determining whether the line-of-sight direction of the user indicates a third location other than the first location in the first space, based on the line-of-sight information; identifying, in a case where the line-of-sight direction of the user is determined to indicate the third location, the second device as an object of control; acquiring sound data indicating the speech of the user from the microphone; generating a control command corresponding to the sound data; and transmitting the control command to the object of control.

According to the above embodiment, further improvement can be realized.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1A is a diagram illustrating an overview of a service that a conversation information providing system according to an embodiment provides;

FIG. 1B is a diagram illustrating an example where a device manufacturer is a data center operator in an embodiment;

FIG. 1C is a diagram illustrating an example where both or one of a device manufacturer and a management company is a data center operator in an embodiment;

FIG. 3 is a flowchart illustrating the operations of the conversation information providing system according to the first embodiment;

FIG. 4A is a diagram illustrating an example of device management information in the first embodiment;

FIG. 4B is a diagram illustrating an example of a conversation dictionary in the first embodiment;

FIG. 19 is a block diagram of a first device and a second device according to a third embodiment;

FIG. 20A is a diagram illustrating an example of device management information according to the third embodiment;

FIG. 20B is a diagram illustrating an example of device management information according to the third embodiment;

FIG. 20C is a diagram illustrating an example of device management information according to the third embodiment;

FIG. 24 is a diagram illustrating an example device management information in the fifth embodiment;

FIG. 33 is a diagram illustrating an overall image of service provided by an information managing system according to a type 3 service (PaaS usage type cloud service); and FIG. 34 is a diagram illustrating an overall image of service provided by an information managing system according to a type 4 service (SaaS usage type cloud service).

Figure 2:
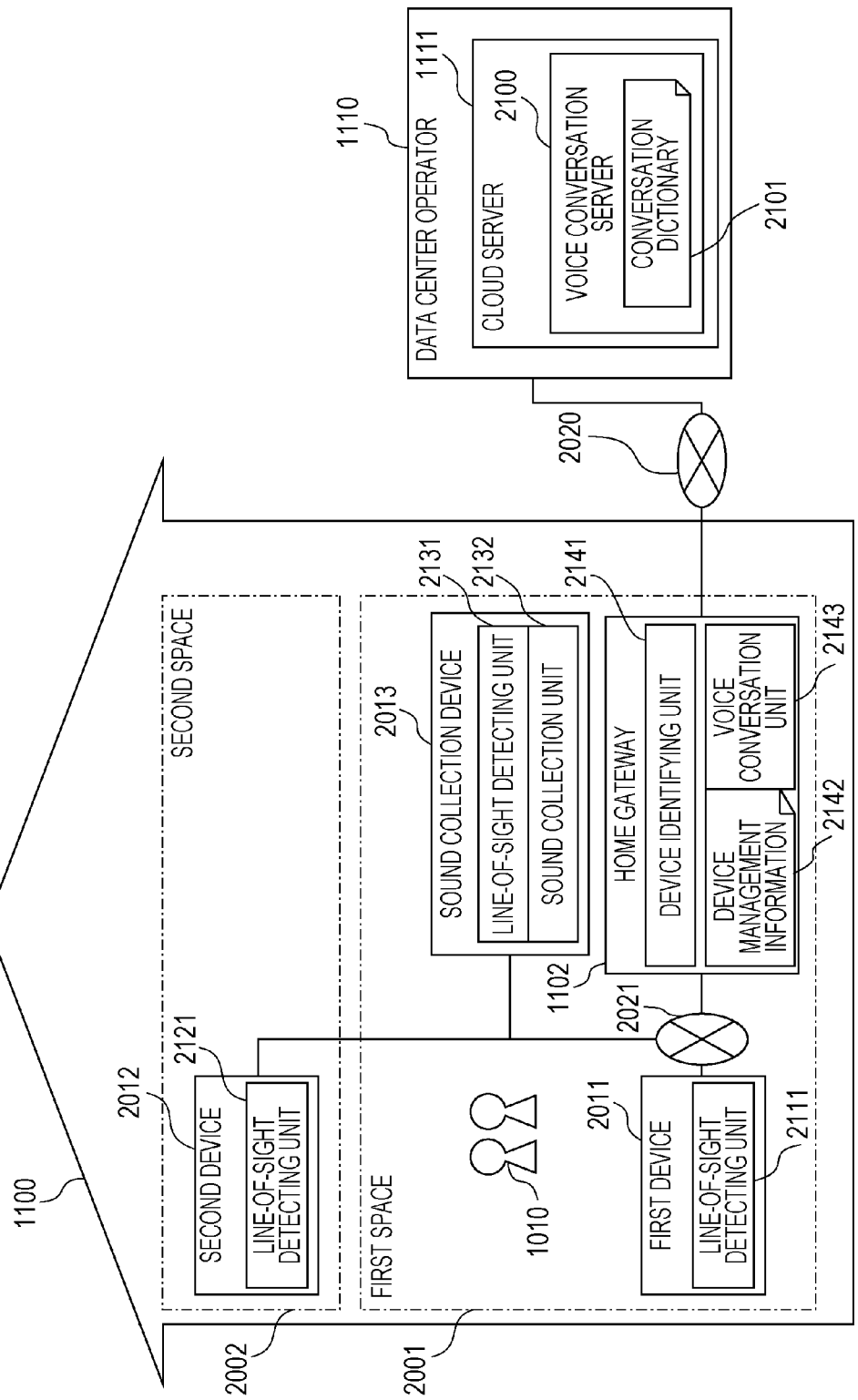
FIG. 2 is a diagram illustrating the configuration of a conversation information providing system according to a first embodiment.

DETAILED DESCRIPTION (Underlying Knowledge Forming Basis of the Present Disclosure)

There is being studied technology of providing a service to perform state confirmation and operation of multiple devices in the home, in accordance with user speech. In such a system, devices obtain voice data of just the content of the speech of the user, by identifying the period from the user starting speaking until ending speaking. The device then analyzes the voice data, and thus decides which electronic device the user wants to confirm or operate, and the contents of the confirmation or operation.

Examples of methods being proposed to obtain the content of user speech include beam forming processing where only sounds from a particular direction are selected, and noise reduction using echo cancellation processing and so forth, where reverberation sound is identified and reduced. However, there is a limit to how much noise reduction processing can be performed, and it is difficult to realize a sufficient level of voice recognition precision in the configuration using current noise reduction.

As for a method to identify the electronic device that the user wants to confirm or operate, and the contents of confirmation operation, there is what is called slot filling technology, where the speech of the user is analyzed, and the results are fit into a frame (template) to advance the conversation. For example, a frame is made up of three types of information, that are "device", "operation", and "location". If the user says "turn on power", "power_on" is set to "operation" in the frame, but the other "device" and "location" frames remain unfilled. In this case, the user makes a query to clarify, such as asking the user "which device do you want turned on?" or "where is the device that you want turned on?" in the course of the conversation. If the user speaks again, and says "air conditioner" or "air conditioner in the living room" or the like, the remaining frames of "device" and/or "location" are filled in. However, this arrangement repeatedly asks the user and prompts the user to speak until all frames are filled in, which may irritate the user. Moreover, misrecognizing the speech when clarifying may lead to further re-clarification, or unintended results.

Also, users may find it uncomfortable speaking to a device, and further find it unnatural speaking without looking at anything. If the initial speech is not recognized, or there are multiple devices, the user will have to restate the content multiple times to identify the device to be operated, which the user may find inconvenient. No technical solution to solve these user needs has been studied.

For example, in a case of the user speaking using an avatar, ceiling microphone, or wearable microphone or the like not correlated with a particular electronic device, identifying which electronic device to operate is difficult.

Thus, in a case where there are multiple devices to be operated, the user needs to include in the speech information for identifying the device to be operated, in addition to the contents of the operation. This makes the speech of the user longer, and accordingly this raises the possibility that the contents of the user speech may not correctly be comprehended due to the effects of noise and so forth. The user has to say many things to operate the devices, and if the device of interest cannot be identified, the user has to restate the information to clarify. This is problematic, since ease-of-use for the user is diminished.

(1) A device control method according to a first aspect of the present disclosure is a control method of a controller connected to a first device, a second device, a camera, and a microphone. The first device is installed at a first location in a first space, and the second device is installed at a second location in a second space. The camera detects a line-of-sight direction of a user, and the microphone detects speech of the user. The first space is visible to the user, and the second space is not visible to the user. The device control method includes: acquiring, from the camera, line-of-sight information indicating the line-of-sight direction of the user; determining whether the line-of-sight direction of the user indicates a third location other than the first location in the first space, based on the line-of-sight information; identifying, in a case where the line-of-sight direction of the user is determined to indicate the third location, the second device as an object of control; acquiring sound data indicating the speech of the user from the microphone; generating a control command corresponding to the sound data; and transmitting the control command to the object of control.

Accordingly, in a case where the line-of-sight of the user is directed toward a particular region other than a location where a device exists, a device existing in a space that cannot be seen by the user is identified as the object of operation. This reduces the occurrence of querying for clarification, improving the ease-of-use of the user.

(2) In the above configuration, the control method may further include: determining whether the line-of-sight direction of the user indicates the first location, based on the line-of-sight information; and identifying, in a case where the line-of-sight direction of the user is determined to indicate the first location, the first device as the object of control.

Accordingly, in a case where the line-of-sight of the user is directed to a certain device, that device is identified as the object of operation. This reduces the occurrence of querying for clarification, improving the ease-of-use of the user.

(3) In the above configuration, the third location may be where the controller is installed.

Accordingly, in a case where the line-of-sight of the user is directed to a device identifying device (controller) such as a home gateway or the like, a device existing in a space that the user cannot see is identified as the object of operation. This reduces the occurrence of querying for clarification, improving the ease-of-use of the user.

(4) In the above configuration, the controller may be provided with the camera.

Accordingly, whether the line-of-sight of the user is directed toward the device identifying device (controller) can be precisely detected with a simple configuration.

(5) In the above configuration, the third location may be where the microphone is installed.

Accordingly, in a case where the line-of-sight of the user is directed toward a ceiling microphone not correlated with any particular device, or toward a sound collection device such as a wearable microphone or the like, a device existing in a space that the user cannot see is identified as the object of operation. This reduces the occurrence of querying for clarification, improving the ease-of-use of the user.

(6) In the above configuration, the microphone may be provided with the camera.

Accordingly, whether the line-of-sight of the user is directed toward the sound collection device (microphone) can be precisely detected with a simple configuration.

(7) In the above configuration, an object may be disposed in the first space, the third position being where the object is disposed.

Accordingly, in a case where the line-of-sight of the user is directed toward a particular object (e.g., a stuffed animal) not correlated with any particular device, a device existing in a space that the user cannot see is identified as the object of operation. This reduces the occurrence of querying for clarification, improving the ease-of-use of the user.

(8) In the above configuration, the object may be provided with the camera.

Accordingly, whether the line-of-sight of the user is directed toward the object can be precisely detected with a simple configuration.

(9) In the above configuration, the object may include a doll.

Accordingly, the object can be provided with a simple configuration.

(10) In the above configuration, a virtual object may be projected in the first space, the third position being where the virtual object is projected.

Accordingly, in a case where the line-of-sight of the user is directed toward a virtual object (e.g., an avatar) not correlated with any particular device, a device existing in a space that the user cannot see is identified as the object of operation. This reduces the occurrence of querying for clarification, improving the ease-of-use of the user.

(11) In the above configuration, the virtual object may include one of an avatar and a hologram.

Accordingly, the virtual object can be provided with a simple configuration.

(12) In the above configuration, the control method may further include notifying the user of the object of control.

Accordingly, the user can be made to confirm the contents of the operation before operating the device existing in a space that the user cannot see, based on the user speech contents, thereby preventing an operation unintended by the user to be performed.

(13) In the above configuration, a third device may be installed in the first space, wherein the acquired sound data may be analyzed, and in a case where a determination is made that the sound data indicating the speech indicates the third device, the third device may be identified as the object of control.

Accordingly, even in a case where the device to be the object of operation has been identified based on the line-of-sight information of the user, a device identified from the user speech contents can be given priority as the object of operation. Accordingly, a situation where a device not intended by the user is selected as the object of operation can be prevented.

(14) In the above configuration, the first space may include a third space, a third device may be installed in the third space, the sound data may be analyzed, in a case where a determination is made that the acquired sound data indicating the speech indicates the third space, the third device may be identified as the object of control.

Accordingly, even in a case where the device to be the object of operation has been identified based on the line-of-sight information of the user, a device identified from the user speech contents can be given priority as the object of operation. Accordingly, a situation where a device not intended by the user is selected as the object of operation can be prevented.

(15) In the above configuration, the microphone may be a plurality of microphones, and, in a case where the sound data is acquired from a first microphone of the plurality of microphones, the one of the first device and second device that has been correlated with the first microphone user beforehand may be identified as the object of control.

Accordingly, in a case where the device to be operated can be identified by the user speech contents, the user speech contents are given priority. This can prevent a device unintended by the user being erroneously selected as the object of operation.

(16) In the above configuration, the controller may include memory, the memory storing a correlation between the sound data and the control command corresponding to the sound data, and the control command may be generated based on the correlation.

Accordingly, the control command can be readily generated.

(17) In the above configuration the controller may be connected to a server, the server may store a correlation between the sound data and the control command corresponding to the sound data, the correlation may be acquired from the server, and wherein the control command may be generated based on the correlation.

Accordingly, the control command can be readily generated.

The present disclosure is not restricted to a device control method that executes processing the above features, and can also be realized as a controller that executes steps included in the device control method according to the features. The present disclosure can further be realized as a computer program that causes a computer to execute the steps included in the device control method according to the features. It is needless to say that such a computer program may be distributed by way of a non-transitory computer-readable recording medium such as a compact disc read-only memory (CD-ROM) or a communication network such as the Internet.

Note that the embodiments described below are all specific examples of the present disclosure. Values, shapes, components, steps, orders of steps, and so forth in the following embodiments are only exemplary, and do not restrict the present disclosure. Components in the following embodiments which are not included in an independent Claim indicating the highest concept are described as being optional components. Also, in all of the embodiments, the contents of each can be combined.

Overview of Service that is Provided

First, an overview of the service that the information management system according to an embodiment provides will be described. FIG. 1A is a diagram illustrating an overview of the service that the information management system according to an embodiment provides. The information management system includes a group 1100, a data center operator 1110, and a service provider 1120.

The group 1100 is, for example, a corporation, an organization, a home, or the like; the scale thereof is irrelevant. The group 1100 has multiple devices 1101 including a first device and a second device, and a home gateway 1102. The multiple devices 1101 include those which are capable of connecting to the Internet, (e.g., a smartphone, personal computer (PC), television set, etc.), and also include those which are incapable of connecting to the Internet on their own (e.g., lighting, washing machine, refrigerator, etc.). There may be, in the multiple devices 1101, those which are incapable of connecting to the Internet on their own but can be connected to the Internet via the home gateway 1102. A user 1010 also uses the multiple devices 1101 within the group 1100.

The data center operator 1110 includes a cloud server 1111. The cloud server 1111 is a virtual server which collaborates with various devices over the Internet. The cloud server 1111 primarily manages massive data (big data) or the like that is difficult to handle with normal database management tools and the like. The data center operator 1110 manages data, manages the cloud server 1111, and serves as an operator of a data center which performs the management, or the like. The services provided by the data center operator 1110 will be described in detail later.

Now, the data center operator 1110 is not restricted just to corporations performing management of data and management of the cloud server 1111. For example, in a case where an appliance manufacturer which develops or manufactures one of the electric appliances of the multiple devices 1101 manages the data or manages the cloud server 1111 or the like, the appliance manufacturer serves as the data center operator 1110, as illustrated in FIG. 1B. Also, the data center operator 1110 is not restricted to being a single company. For example, in a case where an appliance manufacturer and a management company manage data or manage the cloud server 1111 either conjointly or in shared manner, as illustrated in FIG. 1C, both, or one or the other, serve as the data center operator 1110.

The service provider 1120 includes a server 1121. The scale of the server 1121 here is irrelevant, and also includes memory or the like in a PC used by an individual, for example. Further, there may be cases where the service provider 1120 does not include a server 1121.

Note that the home gateway 1102 is not indispensable to the above-described information management system. In a case where the cloud server 1111 performs all data management for example, the home gateway 1102 is unnecessary. Also, there may be cases where there are no devices incapable of Internet connection by themselves, such as in a case where all devices in the home are connected to the Internet.

Next, the flow of information in the above-described information management system will be described. The first device and the second device in the group 1100 first each transmit log information to the cloud server 1111 of the data center operator 1110. The cloud server 1111 collects log information from the first device and second device (arrow 1131 in FIG. 1A). Here, log information is information indicating the operating state of the multiple devices 1101 for example, date and time of operation, and so forth. For example, log information includes television viewing history, recorder programming information, date and time of the washing machine running, amount of laundry, date and time of the refrigerator door opening and closing, number of times of the refrigerator door opening and closing, and so forth, but is not restricted to these, and various types of information which can be acquired from the various types of devices may be included. The log information may be directly provided to the cloud server 1111 from the multiple devices 1101 themselves over the Internet. Alternatively, the log information may be temporarily collected from the multiple devices 1101 to the home gateway 1102, and be provided from the home gateway 1102 to the cloud server 1111.

Next, the cloud server 1111 of the data center operator 1110 provides the collected log information to the service provider 1120 in a certain increment. The certain increment here may be an increment in which the data center operator 1110 can organize the collected information and provide to the service provider 1120, or may be in increments requested by the service provider 1120. Also, the log information has been described as being provided in certain increments, but the amount of information of the log information may change according to conditions, rather than being provided in certain increments. The log information is saved in the server 1121 which the service provider 1120 has, as necessary (arrow 1132 in FIG. 1A).

The service provider 1120 organizes the log information into information suitable for the service to be provided to the user, and provides to the user. The user to which the information is to be provided may be the user 1010 who uses the multiple devices 1101, or may be an external user 1020. An example of a way to provide information to the users 1010 and 1020 may be to directly provide information from the service provider 1120 to the users 1010 and 1020 (arrows 1133 and 1134 in FIG. 1A). An example of a way to provide information to the user 1010 may be to route the information to the user 1010 through the cloud server 1111 of the data center operator 1110 again (arrows 1135 and 1136 in FIG. 1A). Alternatively, the cloud server 1111 of the data center operator 1110 may organize the log information into information suitable for the service to be provided to the user, and provide to the service provider 1120. Also, the user 1010 may be different from the user 1020, or may be the same.

First Embodiment

An example of a case where the user uses a device having sound collection functions, such as a ceiling microphone or the like, to perform state confirmation and operation of devices by speech, will be described in a first embodiment. In the present embodiment, when the line-of-sight of the user is directed toward a certain device, that device is selected as the object device. In a case where the line-of-sight of the user is toward a space where there is no device (e.g., toward the sound collection device), a device not in the visual range of the user is selected as the object device.

FIG. 2 is a diagram illustrating the configuration of the conversation information providing system according to the present embodiment. The conversation information providing system includes the group 1100, and a voice conversation server 2100 within the data center operator 1110. The group 1100 and the voice conversation server 2100 are connected via a network 2020.

The group 1100 includes a first space 2001 and a second space 2002. For example, the group 1100 is a home (house), and the first space 2001 and second space 2002 are rooms such as a living room and a bedroom. Note that a space may include multiple rooms. Also note that the spaces may be the first and second floors of the house, or may be regions within a single room.

The group 1100 includes a first device 2011, a second device 2012, a sound collection device 2013, and a home gateway 1102. The first device 2011, sound collection device 2013, and home gateway 1102 are installed in the first space 2001, and the second device 2012 is installed in the second space 2002. The first device 2011, second device 2012, sound collection device 2013, and home gateway 1102 are connected via a network 2021. Any arrangement that enables communication between devices will suffice for the network 2021, examples including a cabled local area network (LAN), wireless LAN, Bluetooth (a registered trademark), specified low power radio (a Japanese standard), and so forth. The first device 2011 and second device 2012 are home appliances such as an air conditioner, lighting, or the like, with the actions thereof being operated or controlled based on conversation with the user.

First, an overview of operations in the conversation information providing system according to the present embodiment will be described. FIG. 3 is a flowchart of processing for identifying an object device as the object of operation in the conversation information providing system according to the present embodiment.

Note that the following processing is performed by a device identifying device included in the conversation information providing system. An example of the device identifying device is the home gateway 1102. Note that the following processing may be performed by one or multiple devices included in the group 1100, or may be performed in a distributed manner between the one or multiple devices included in the group 1100 and external devices (e.g., the voice conversation server 2100) connected with the one or multiple devices included in the group 1100 via a network.

First, the device identifying device determines whether or not the object device can be identified based on the user speech contents (S101). In a case where the object device cannot be identified based on the user speech contents (No in S101), the device identifying device determines whether or not the line-of-sight of the user is directed toward one of the devices (S103). Specifically, the device identifying device acquires line-of-sight information relating to which direction the line-of-sight of the user is directed toward. Next, the device identifying device determines whether or not the line-of-sight of the user is directed toward the second device included in the multiple devices, which is included in the space that the user is capable of viewing. The device identifying device also determines whether the line-of-sight of the user is directed toward a first region which is a part of the space visible to the user but is different from the location where the multiple devices exist. A visible space here is a space that the user can visually recognize from the current position.

In a case where the line-of-sight of the user is not directed toward any of the devices, i.e., in a case where the line-of-sight of the user is directed toward the first region (No in S103), the device identifying device identifies, of the multiple devices, the first device that exists in a space not visible to the user to be the object device (S105). A space not visible here is a space that the user cannot visually recognize from the current position.

On the other hand, in a case where the line-of-sight of the user is directed toward any one of the devices, i.e., in a case where determination is made that the line-of-sight of the user is directed toward the second device (Yes in S103), the second device is identified as the object device (S104).

In a case where the object device can be identified based on the user speech contents (Yes in S101), the device identifying device decides that the device identified based on the user speech contents is the object device (S102). That is to say, even in a case where the line-of-sight of the user is directed toward the first region or the second device, in a case where there is information included in the user speech contents to identify the third device included in the multiple devices, the third device is identified as the object device.

Next, the device identifying device makes confirmation with the user that the identified object device control command is correct (S106). Specifically, the device identifying device notifies the user of the identified object device, and receives a reply. Note that confirmation may be made with the user regarding the control contents as to the object device, in addition to confirmation of the object device.

In a case where the user approves of the identified object device (Yes in S107), the control device operates the object device according to user operations (S108). Specifically, in the device identifying device generates a command for controlling the object device based on the user speech contents, and transmits this command to the object device.

On the other hand, in a case where the identified object device is not approved by the user (No in S107), the device identifying device performs conversation to query the user for clarification of the object device (S109), and performs the processing of step S101 and thereafter using the user speech contents obtained from this conversation.

According to the above processing, in a case where the line-of-sight of the user is directed to a particular region other than a location where a device exists, a device existing in a space not visible to the user is identified to be the object of operation. This reduces the occurrence of querying for clarification, improving the ease-of-use of the user.

For example, a case will be assumed where the user is in the living room, and air conditioners are installed in the living room and bedroom. In this case, if the user wants to control the air conditioner in the living room, the user directs the line-of-sight toward the air conditioner in the living room and says "Turn on air conditioner", and thus can control the air conditioner in the living room. Further, if the user wants to control the air conditioner in the bedroom, the user says the same thing but without looking at any of the devices installed in the living room, and thus can control the air conditioner in the bedroom.

Thus, according to the technique of the present embodiment, the object device can be identified based on the user's line-of-sight, even in a case where the object device exists out of the visual range of the user. Thus, the user speech contents do not have to be as long, so not only can ease-of-use be improved for the user, but also cases where the contents of the speech cannot be understood or are misunderstood due to the influence of noise and so forth can be reduced.

Although FIG. 3 illustrates an arrangement where the object device is confirmed and querying is performed in steps S106, S107, and S109, this processing does not have to be performed. Confirmation of the object device command may be performed only after one of steps S102, S104, and S105. For example, in a case where the object device is selected based on speech contents (after S102), the object device does not have to be confirmed.

Also, it should be noted that the order of the processing of steps S101 and S103 are exemplary, and processing may be performed in the opposite order from these, and at least part may be performed in parallel.

Although an example of operating devices primarily based on user speech will be described in the present embodiment, the same technique can be applied in a case where multiple devices are operated by other techniques as well. For example, the same technique can be used in a case of operating devices by gestures.

An example of the configuration and operations of the devices will be described in detail below. As illustrated in FIG. 2, the first device 2011 includes a line-of-sight detecting unit 2111, and the second device 2012 includes a line-of-sight detecting unit 2121. The line-of-sight detecting units 2111 and 2121, and a later-described line-of-sight detecting unit 2131, have an infrared camera or visible light camera, images acquired from these cameras are analyzed, and face recognition and so forth is used to detect whether the line-of-sight of the user is directed toward itself or not. Note that the line-of-sight detecting units 2111, 2121, and 2131 may detect the direction of the face of the user as the direction of the line-of-sight, or may detect the movement of the eyes of the user as the direction of the line-of-sight.

Although an example is described here where the each of the devices detects whether the line-of-sight of the user is directed toward itself, an arrangement may be made where the direction of the line-of-sight of the user is detected by images taken by one or more cameras disposed within the group 1100 being analyzed, and the direction of the line-of-sight of the user may be detected by other techniques as well.

In the following description, an example will be described where determination is made regarding whether or not the user will start talking, using detection of the line-of-sight as a trigger. However, lip detection, gesture detection, or speech detection of a fixed word such as "microphone on" or the like, may be used for determination regarding whether or not the user will start talking, instead of or in addition to detection of the line-of-sight. Lip detection is detecting mount motions or lip actions of the user from images taken by cameras, and determining whether the user will start to talk based on the lip actions. In gesture detection, determination of whether or not the user will start talking is made based on images taken by the camera or audio data when the user performs a predetermined action, such as clapping or raising a hand.

The sound collection device 2013 includes the line-of-sight detecting unit 2131 and a sound collection unit 2132. The sound collection unit 2132 acquires ambient sound, and stores the user speech contents included in this sound for a predetermined amount of time. Specifically, the sound collection unit 2132 identifies the direction where the speech source (user) is, based on position information of the user, obtained by the camera or the like, and reduces ambient noise from the obtained sound using the direction of the speech source, thereby extracting the user speech contents.

The sound collection device 2013 may be any sort of device, as long as it has functions to collect sound and functions to transfer data of the sound collection. Examples of the sound collection device 2013 include a ceiling microphone installed on the ceiling, a wearable microphone that the user wears on the body, a stuffed animal having sound collecting functions, and so forth.

The home gateway 1102 includes a device identifying unit 2141 and a voice conversation unit 2143. The home gateway 1102 also stores device management information 2142. When the line-of-sight of the user is detected by the line-of-sight detecting units 2111, 2121, or 2131, of the first device 2011, second device 2012, or sound collection device 2013, the device identifying unit 2141 uses the device management information 2142 to identify the object device to be operator.

The device management information 2142 indicates the location where each device is installed, and whether there is line-of-sight detection function (described in detail later). The voice conversation unit 2143 performs voice conversation processing. Specifically, the voice conversation unit 2143 issues a sound collection start command to the sound collection device 2013, thereby acquiring sound data including the user speech contents, and transfers the acquired sound data to the voice conversation server 2100. The voice conversation unit 2143 acquires a control command based on the speech content included in the sound data from the voice conversation server 2100, and transmits the control command to the object device. Note that the home gateway 1102 and sound collection device 2013 are separately provided in the present embodiment, but the home gateway 1102 may have the functions of the sound collection device 2013 therein.

The voice conversation server 2100 is a type of cloud server 1111, and stores the conversation dictionary 2101. The voice conversation server 2100 identifies the speech contents from the sound data by analyzing the sound data, and uses the conversation dictionary 2101 to identify a control command from the speech contents.

The conversation dictionary 2101 lists rules to identify control commands from the speech contents (text), which will be described in detail later. Although the voice conversation server 2100 and home gateway 1102 are separately provided in the present embodiment, the functions of the voice conversation server 2100 may be included in the home gateway 1102. Also, a part of the functions of the voice conversation server 2100 may be included in the home gateway 1102.

FIG. 4A is a diagram illustrating an example of the device management information 2142 in the present embodiment. The device management information 2142 includes identifying information to uniquely identify the devices, attribute information indicating whether or not a device is a home gateway, type information indicating the category of the function that the device has, sound collection information indicating whether or not the device has sound collection functions, installation location information indicating the location that the device is installed, and speech information indicating whether or not the device is a device that has detected the speech start trigger (line-of-sight) of the user.

The identifier information is generated from a Media Access Control (MAC) address and a random number when pairing using Wi-Fi or Bluetooth or the like, for example. Alternatively, an identifier included in the instance list notification in ECHONET Lite (a Japanese standard) may be used as the identifier information. In a case where a home appliance control protocol such as ECHONET Lite is supported, the category information in the home appliance control may be used to set the attribute information and type information.

The sound collection information is set based on whether or not a sound collection function is included, notified at the time of pairing using Wi-Fi or Bluetooth or the like. The installation location information is set using the settings menu of the home gateway 1102 or the like. The speech information is set at the time of the speech start trigger (line-of-sight) of the user being detected by the line-of-sight detecting unit 2111, line-of-sight detecting unit 2121, or line-of-sight detecting unit 2131, of the first device 2011, second device 2012, or sound collection device 2013.

FIG. 4B is a diagram illustrating an example of the conversation dictionary 2101 according to the present embodiment. The conversation dictionary 2101 includes speech recognition text information indicating character string information (speech contents) obtained as the result of speech recognition, and action information for identifying control commands from the speech recognition text. Action information includes control command information indicating control commands identified from speech recognition text, device information indicating the type (attributes) of the object device, and location information indicating the location where the object device is installed.

For example, in a case where the user says "Turn on living room light", keyword matching of "living room", "lighting", and "turn on" fill in all frames (control command (power_on), device (lighting), and location (living room)) as action information. Accordingly, processing is performed to turn on the lighting installed in the living room.

Also, in a case where the user says "Turn on air conditioner", keyword matching of "air conditioner" and "turn on" fill in the frames other than location (control command (power_on) and device (air conditioner))) as action information. If there is only one air conditioner in the house, processing to turn the power of that air conditioner on is performed. If there are two or more air conditioners installed, the user is queried for clarification by a question "Where is the air conditioner to turn on?" to which the user specifies the location. This, the air conditioner for which the power should be turned on is finally identified.

Also, if the user says "Turn on cooler", nothing has been said that identifies the device itself, but operation instruction content unique to the device has been spoken, so the device information is supplemented using the conversation dictionary 2101. On the other hand, if the user just says "Turn on power" or "Make it warmer", only the control command (power_on, heating_on) is filled in as action information, so the user needs to specify information of device or location.

Also, there are cases, such as the user saying "All off", where operation can be performed even if only the control command (all_off) of the action information is filled in.

Figure 5:
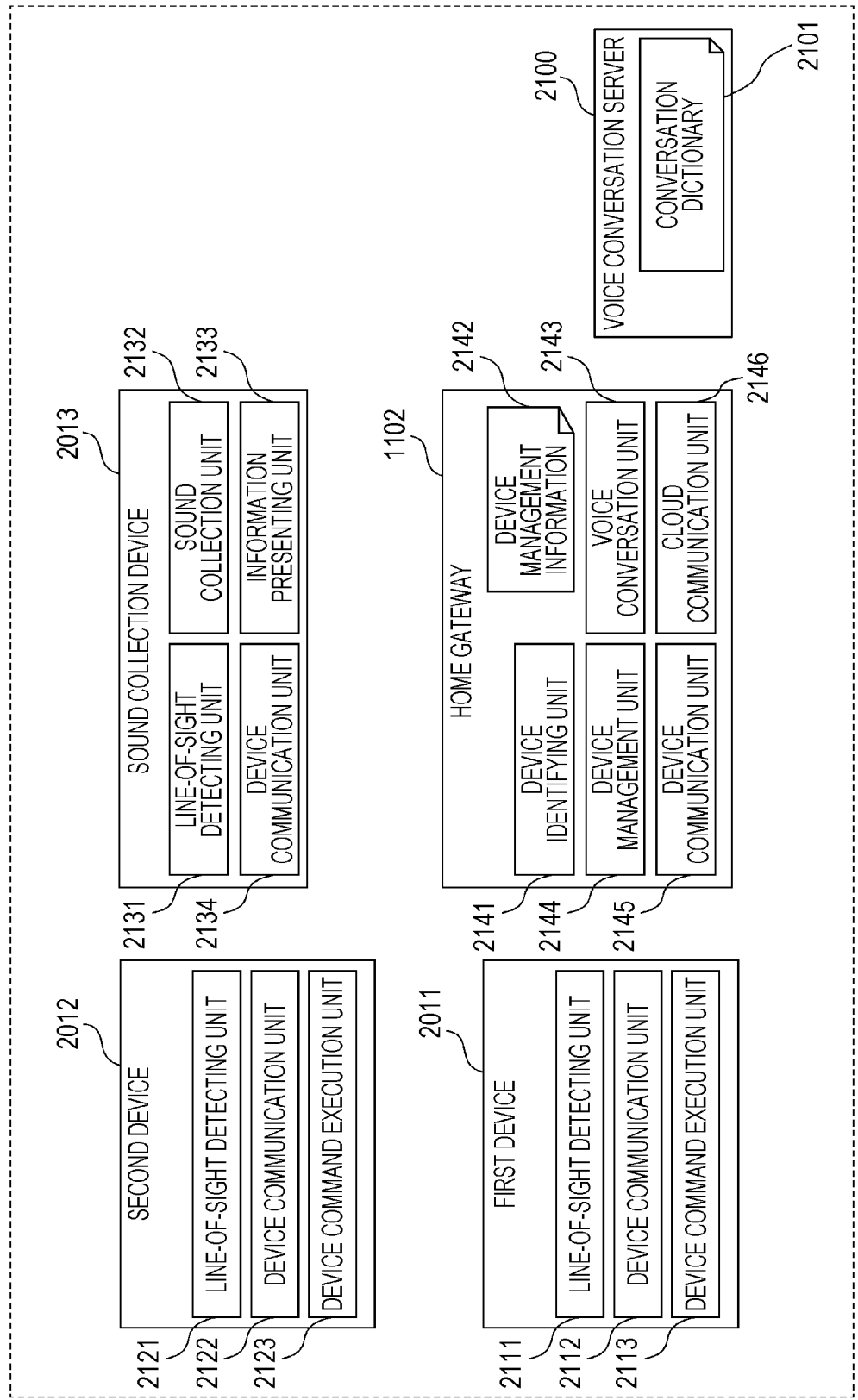
FIG. 5 is a block diagram of devices included in the conversation information providing system according to the first embodiment.

FIG. 5 is a block diagram illustrating a configuration example of the devices in the conversation information providing system according to the present embodiment. The first device 2011 includes, in addition to the aforementioned line-of-sight detecting unit 2111, a device communication unit 2112 and device command execution unit 2113. The second device 2012 includes, in addition to the aforementioned line-of-sight detecting unit 2121, a device communication unit 2122 and device command execution unit 2123.

The device communication unit 2112 is a home appliance control protocol stack such as ECHONET Lite or the like. Specifically, the device communication unit 2112 performs instance list notification such as notification in a case where the first device 2011 is activated, notification of the device state such as notification of changes such as power on or off, as to the home gateway 1102, and reception of control commands such as power on settings from the home gateway 1102, analyzing and executing of the control command, and response thereto of the execution results. Notification of the line-of-sight detection results to the home gateway 1102 may be performed using this notification function, or may be performed using a unique protocol.

The device command execution unit 2113 converts the control commands received from the device communication unit 2112 into hardware commands, so as to be executed. The functions of the line-of-sight detecting unit 2121, device communication unit 2122, and device command execution unit 2123 are the same as those of the line-of-sight detecting unit 2111, device communication unit 2112, and device command execution unit 2113.

The sound collection device 2013 includes, in addition to the aforementioned line-of-sight detecting unit 2131 and sound collection unit 2132, an information presenting unit 2133 and a device communication unit 2134. The information presenting unit 2133 provides the user detected by the line-of-sight detecting unit 2131 with various types of information. For example, the information presenting unit 2133 outputs voice to the user such as "Please speak" or flashes a light-emitting diode (LED) light to prompt the user to speak. The functions of the device communication unit 2134 are the same as those of the aforementioned device communication units 2112 and 2122.

The home gateway 1102 has, in addition to the aforementioned device identifying unit 2141 and voice conversation unit 2143, a device management unit 2144, a device communication unit 2145, and a cloud communication unit 2146. The functions of the device communication unit 2145 are the same as the functions of the aforementioned device communication units 2112, 2122, and 2134. The cloud communication unit 2146 manages whether the user has agreed to the consent agreement when using the conversation function, and if the user has agreed to the consent agreement establishes a connection with the voice conversation server 2100, and exchanges information with the voice conversation server 2100.

Figure 6:
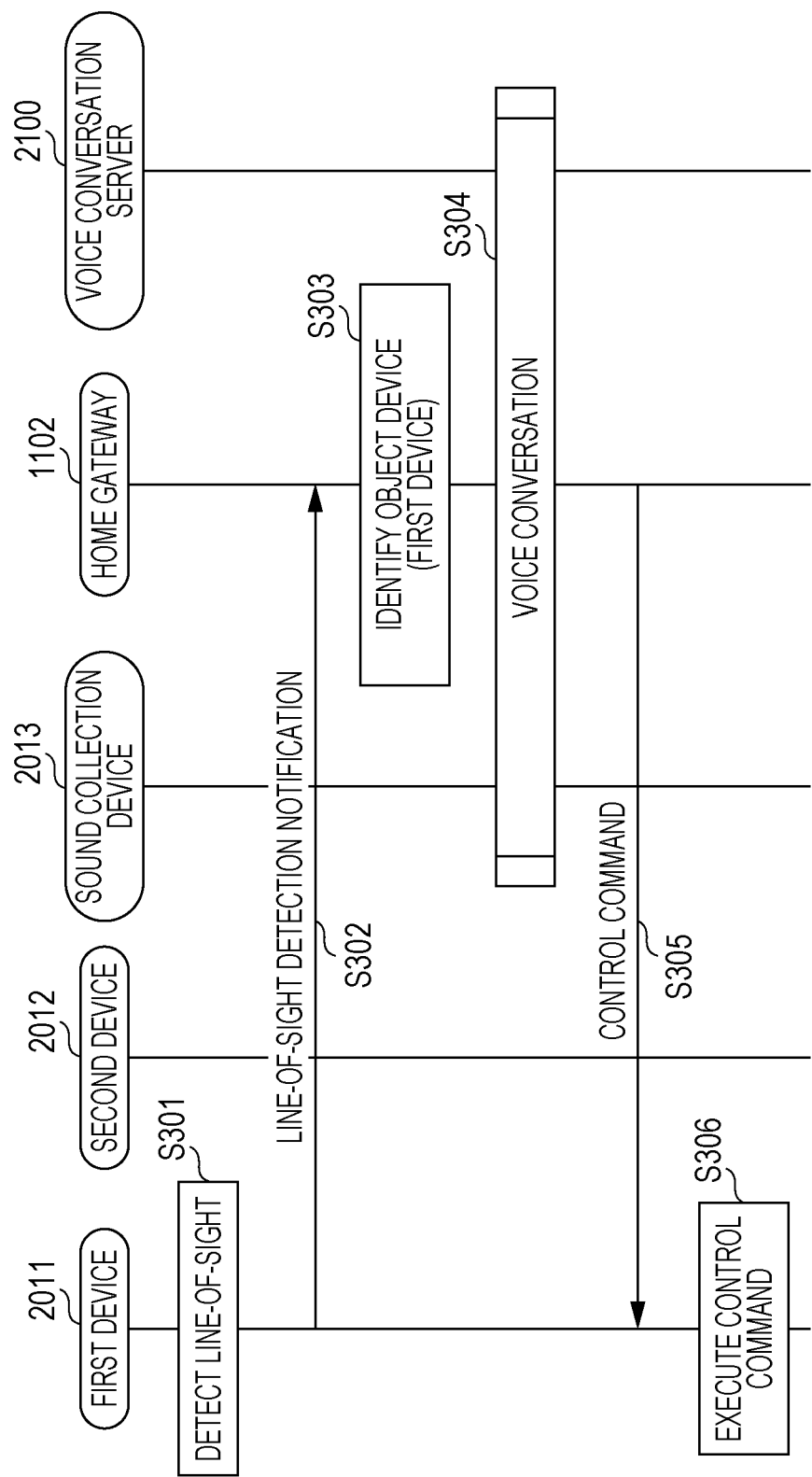
FIG. 6 is a diagram illustrating an operation example of the conversation information providing system according to the first embodiment.

FIG. 6 is a diagram illustrating an operation example of the conversation information providing system according to the present embodiment, in a case where the user speaks to an object device. For example, the first device 2011 is the air conditioner installed in the first space 2001 (first-floor living room), the second device 2012 is an air conditioner installed in the second space 2002 (second-floor bedroom), and the sound collection device 2013 is a microphone installed on the ceiling of the first space 2001 (first-floor living room). The user is in the first space 2001, and looks at the first device 2011 and says "Turn on air conditioner".

Accordingly, the first device 2011 detects that the line-of-sight of the user is directed toward itself (S301), and notifies the detection results to the home gateway 1102 (S302). The home gateway 1102 identifies the object device (S303). In this case, the line-of-sight of the user is directed toward the first device 2011, so the first device 2011 is decided to be the object device.

Next, the sound collection device 2013, home gateway 1102, and voice conversation server 2100 perform voice conversation processing (S304). This voice conversation processing is processing where the home appliance operation that the user intends is identified from character string information obtained as a result of having analyzed the sound data collected of the user's speech, and the conversation dictionary 2101, and the results thereof are notified to the user. In the example of the conversation dictionary 2101 in FIG. 4B, an action for "location" regarding the speech recognition text "Turn on air conditioner" cannot be identified. On the other hand, the object device has been identified in step S303, "location" can be supplemented with "first space (living room)".

Next, the home gateway 1102 transmits a control command to the first device 2011 based on the results of the voice conversation processing (S305). The first device 2011 executes the received control command (S306). According to this flow, the device can be identified and operated even without the user speaking content that identifies the device.

In a case where there is an element that identifies the device in the user speech contents, the device identified in the user speech contents is given priority over the device identified in step S303, and the device identified by the user speech contents is decided to be the object device. For example, if the user says "Turn on bedroom air conditioner" while looking at the living room air conditioner (first device 2011), the bedroom air conditioner is turned on, and not the living room air conditioner.

Figure 7:
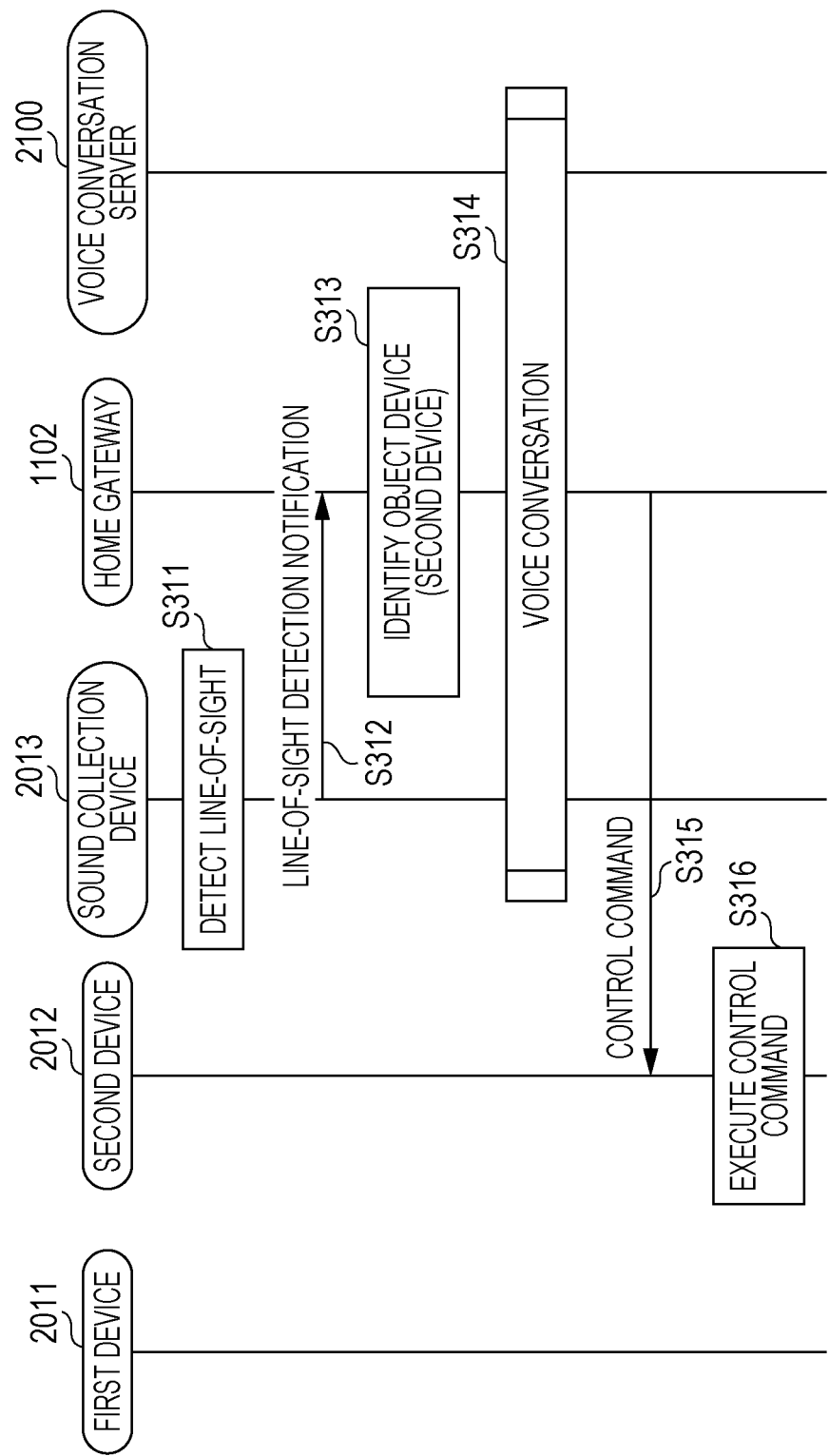
FIG. 7 is a diagram illustrating an operation example of the conversation information providing system according to the first embodiment.

FIG. 7 is a diagram illustrating an operation example of the conversation information providing system according to the present embodiment, in a case where the user speaks to the sound collection device 2013. The user looks at the sound collection device 2013 and says "Turn on air conditioner".

The sound collection device 2013 detects that the line-of-sight of the user is directed toward itself (S311), and notifies the detection results to the home gateway 1102 (S312). The home gateway 1102 identifies the object device (S313). In this case, the line-of-sight of the user is directed toward the sound collection device 2013 so out of the first device 2011 and second device 2012, the home gateway 1102 selects the second device 2012 that is out of the viewing range of the user as the object device. Note that the user is in the first space 2001 (living room), and the second device 2012 disposed in the second space 2002 (bedroom), that is a different space from the first space 2001, is selected for the object device.

Next, the sound collection device 2013, home gateway 1102, and voice conversation server 2100 perform voice conversation processing (S314) in the same way as in S304. The home gateway 1102 transmits a control command to the second device 2012 based on the results of the voice conversation processing (S315). The second device 2012 executes the received control command (S316). According to this flow, the device can be identified and operated even without the user speaking content that identifies the device, by speaking to the sound collection device 2013 that is not correlated with the device.

Figure 8:
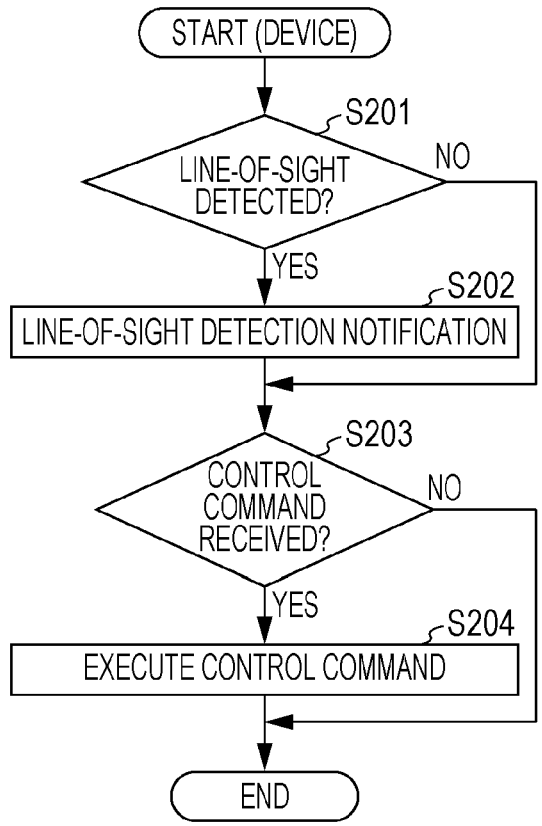
FIG. 8 is a flowchart illustrating operation of a device according to the first embodiment.

Next, operations of the devices will be described. FIG. 8 is a flowchart illustrating the flow of operations of the first device 2011. Note that the operations of the second device 2012 are the same.

First, the first device 2011 detects whether the line-of-sight of the user is directed toward itself, and thus detects the start of speech by the user (S201). In a case of detecting the line-of-sight of the user (Yes in S201), the first device 2011 transmits a line-of-sight detection notification to the home gateway 1102 indicating that the line-of-sight of the user has been detected (S202).

In a case of having received a control command from the home gateway 1102 (Yes in S203), the first device 2011 executes the received control command (S204).

Figure 9:
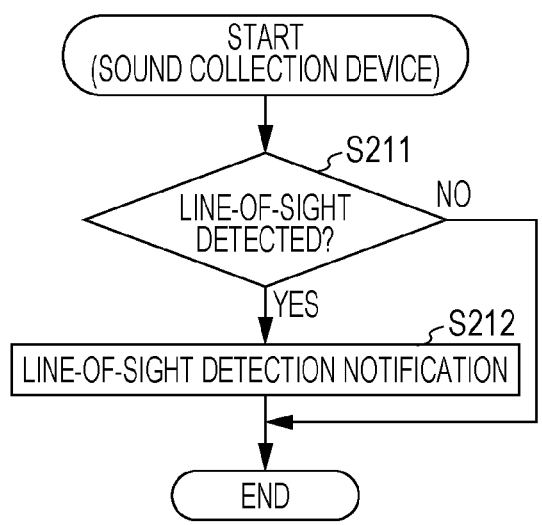
FIG. 9 is a flowchart illustrating operation of a sound collection device according to the first embodiment.

FIG. 9 is a flowchart illustrating the flow of operations at the sound collection device 2013. First, the sound collection device 2013 detects whether the line-of-sight of the user is directed toward itself, and thus detects the start of speech by the user (S211). In a case of detecting the line-of-sight of the user (Yes in S211), the sound collection device 2013 transmits a line-of-sight detection notification to the home gateway 1102 indicating that the line-of-sight of the user has been detected (S212).

Figure 10:
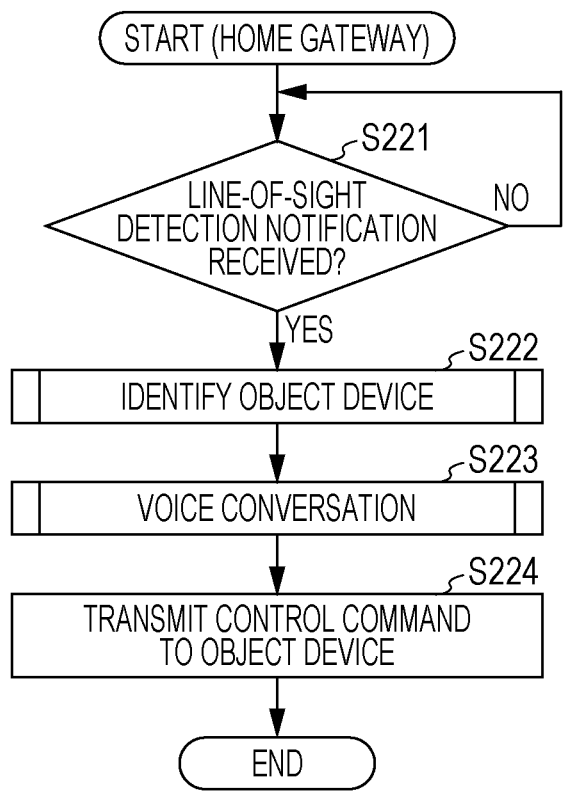
FIG. 10 is a flowchart illustrating operation of a home gateway according to the first embodiment.

FIG. 10 is a flowchart illustrating the flow of operations at the home gateway 1102. In a case where the home gateway 1102 receives a line-of-sight detection notification from the first device 2011, second device 2012, or sound collection device 2013 (Yes in S221), the home gateway 1102 identifies the object device depending on which device has detected the line-of-sight (S222). Next, the home gateway 1102 performs voice conversation processing (S223). The home gateway 1102 then transmits the control command determined in the voice conversation processing to the object device identified in step S222 (S224).

Figure 11:
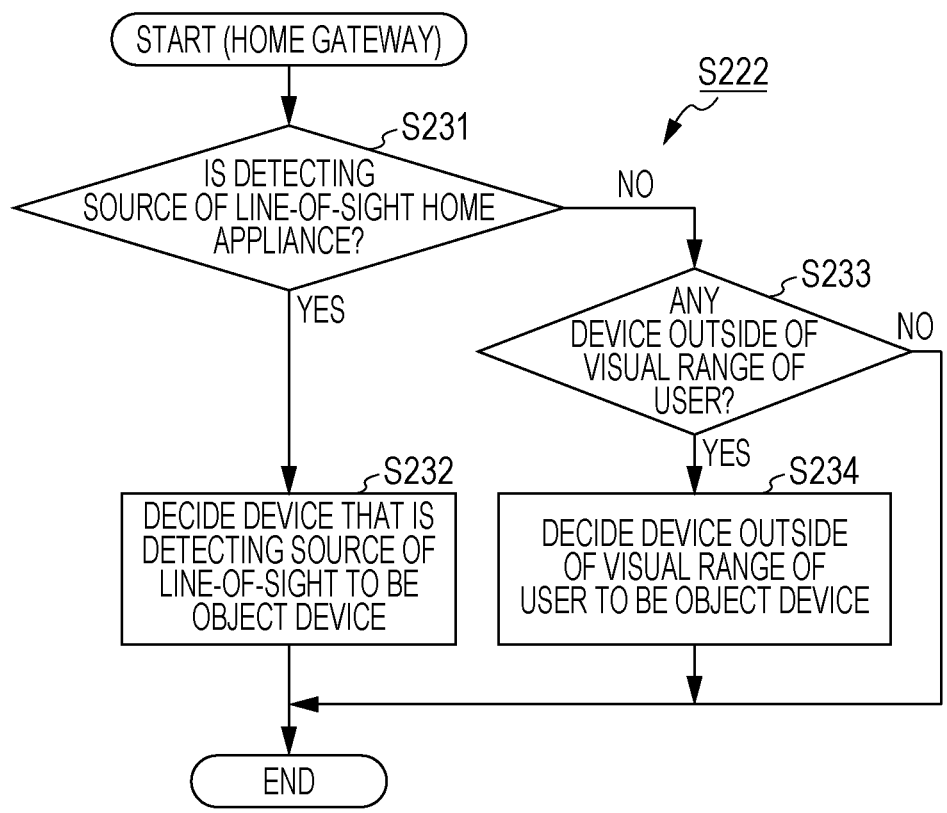
FIG. 11 is a flowchart of object device identifying processing according to the first embodiment.

The details of the processing to identify the object device at the home gateway 1102 (S222) will now be described in detail. FIG. 11 is a flowchart illustrating the object device identifying determining processing (S222) in detail.

The home gateway 1102 references the device management information 2142 and determines whether the transmission source of the line-of-sight detection notification is a home appliance or not (S231). A home appliance here is a device which is the object of operation by voice conversation.

In a case where the transmission source of the line-of-sight detection notification is a home appliance (Yes in S231), the home gateway 1102 decides a device that is the transmission source of the line-of-sight detection to be the object device (S232). On the other hand, in a case where the transmission source of the line-of-sight detection notification is not a home appliance (No in S231), the home gateway 1102 references the device management information 2142 and determines whether there is a device out of the visual range of the user (S233).

Specifically, detection is made regarding which space the user is in. For example, the home gateway 1102 detects that the user is in the same space (e.g., a room) as the transmission source of the line-of-sight detection notification. The home gateway 1102 may determine that the user is in the same space as the space where the sound collection device 2013 that has acquired the voice of the user is installed. Alternatively, the home gateway 1102 may determine that the user is near the transmission source of the line-of-sight detection notification. Further, the home gateway 1102 may determine the position of the user from information obtained from cameras installed within the group 1100.

The home gateway 1102 references the device management information 2142, and determines devices existing in spaces other than the space where the user is (e.g., a room) to be devices out of the visual range of the user. An arrangement is described here where the devices are determined as being within the visual range or outside of the visual range, based on whether the device exists in the same space where the user is (e.g., a room). However, an arrangement may be made where the home gateway 1102 determines the position of the devices and the user in further detail, and also identifies the devices that the user can actually see from the position of the user, using a detailed layout of the space where the user is, and determine devices other than identified devices to be devices out of the visual range of the user.

In a case where there is a device is out of the visual range of the user (Yes in S233) the home gateway 1102 decides the device out of the visual range of the user to be the object device (S234).

On the other hand, in a case where there are no devices out of the visual range of the user (No in S233), the home gateway 1102 does not decide an object device, and decides all devices to be object device candidates.

In a case where all devices managed by the device management information 2142 are set as default candidates for the object device beforehand, and a device is selected in step S232 or S234 as the object device, updating may be performed so that just this device is the object device.

Also, an example has been described here where just one device is selected in step S232 or S234 as the object device, in a case where a determination standard other than line-of-sight for determining the object device is used, the priority of the selected device may be set higher. Accordingly, the most probable device can be selected through combination with other determination standards. Also, in a case where there are multiple devices outside of the visual range of the user, the priority of these devices may be set high, and one device may be selected based on another determination standard. Note that the same modification may be applied to the other embodiments described below.

Figure 12:
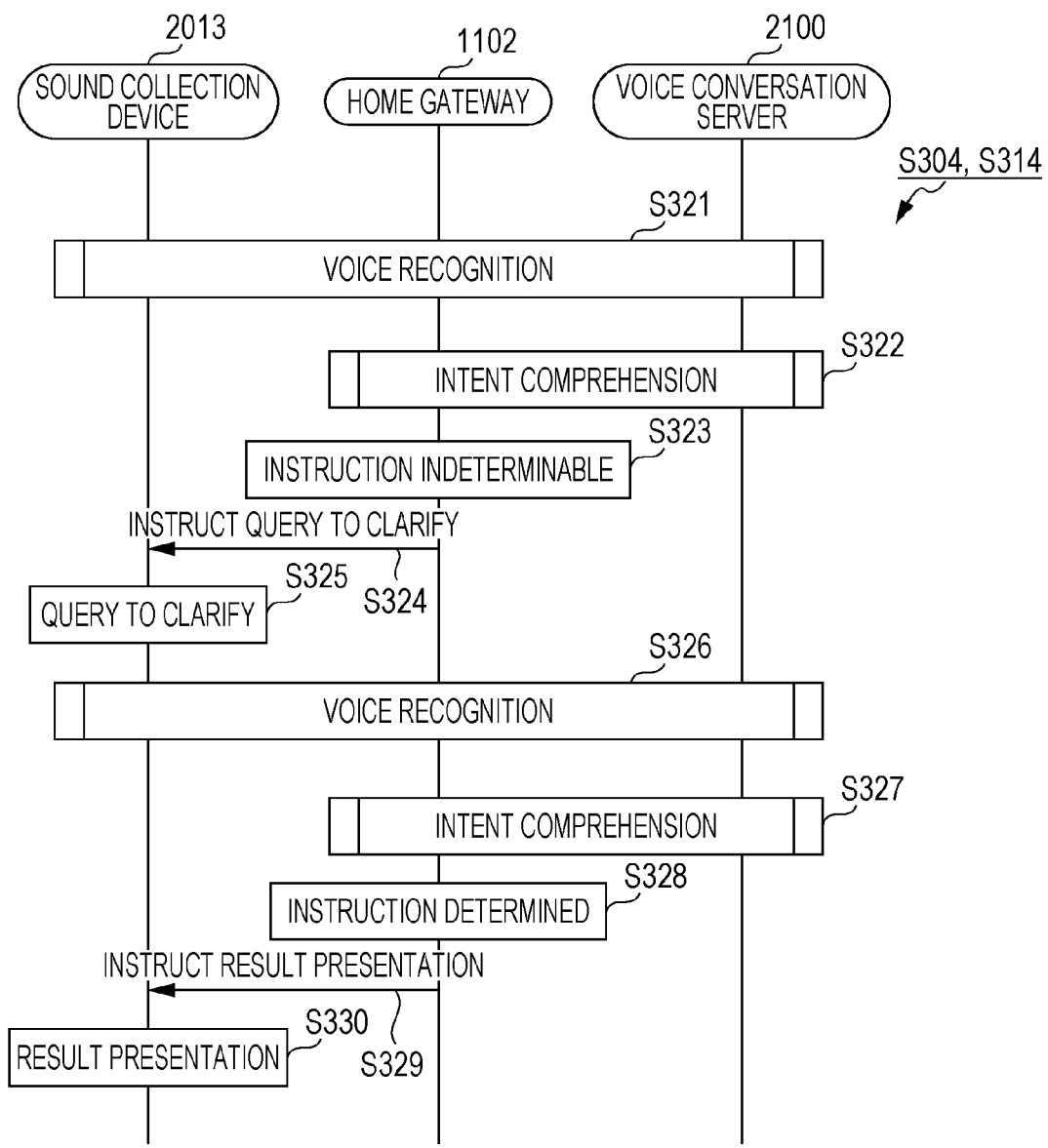
FIG. 12 is a diagram illustrating an operation example of voice conversation processing according to the first embodiment.

The voice conversation processing in FIGS. 6 and 7 (S304 and S314) will be described in detail. FIG. 12 is a diagram illustrating an example of operations of the voice conversation processing in (S304 and S314).

The sound collection device 2013, home gateway 1102, and voice conversation server 2100 perform voice recognition processing to convert the speech contents into text (S321). Next, the home gateway 1102 and voice conversation server 2100 perform intent comprehension processing to output a control command to a device, from the recognition text obtained as the result of the voice recognition processing, based on the conversation dictionary 2101 (S322). In a case where the object device or the control command has not been identified by this intent comprehension processing (S323), the home gateway 1102 instructs the sound collection device 2013 to query the user for clarification (S324). Upon receiving the instruction to query for clarification, the sound collection device 2013 queries the user for clarification in order to identify the object device or control command (S325).

Voice recognition processing (S326) and intent comprehension processing (S327) are performed again in response to the speech contents obtained as a result of the query for clarification. In a case where the object device and control command have been identified by this intent comprehension processing (S328), the home gateway 1102 transmits, to the sound collection device 2013, an instruction to present the voice conversation results to the user (S329). Upon having received the instruction to present results, the sound collection device 2013 presents information of the voice conversation results to the user (S330).

Figure 13:
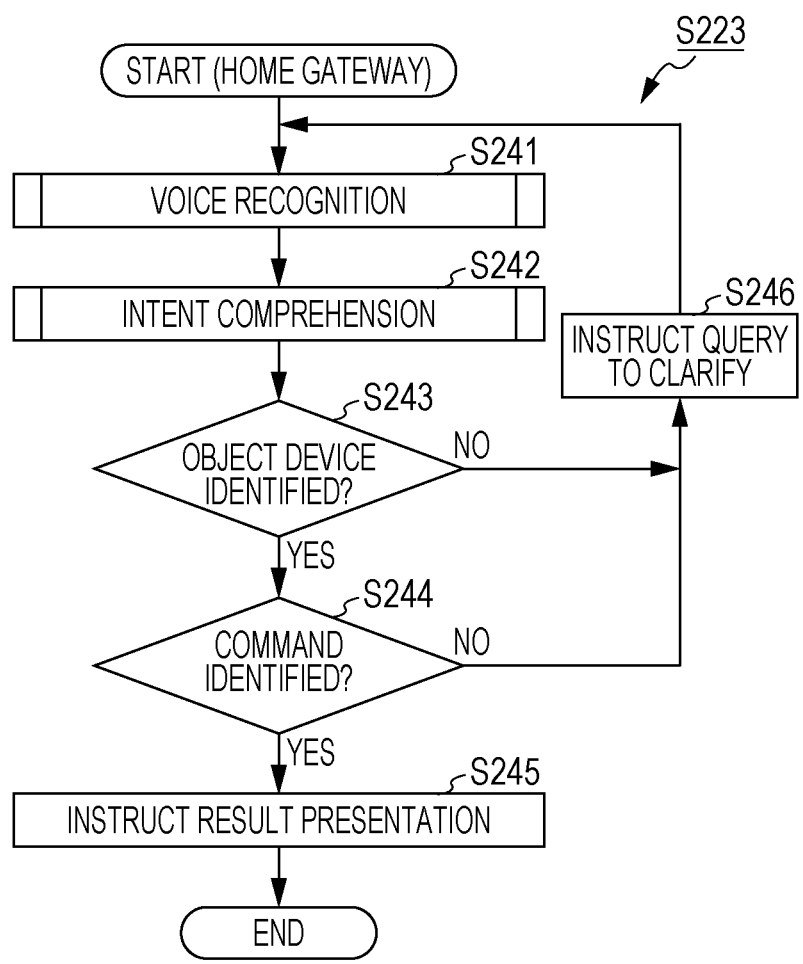
FIG. 13 is a flowchart diagram of voice conversation processing according to the first embodiment.

FIG. 13 is a flowchart of voice conversation processing performed by the home gateway 1102 (S223 in FIG. 10). First, the home gateway 1102 performs voice conversation processing (S241) and intent comprehension processing (S242). Next, the home gateway 1102 determines whether or not the object device has been identified (S243). In a case where the device has been identified (Yes in S243), the home gateway 1102 determines whether or not the control command has been identified (S244). In a case where the control command has been identified (Yes in S244), the home gateway 1102 transmits an instruction to the sound collection device 2013 to display the results of voice conversation (S245).

On the other hand, in a case where determination is made that the object device as not been identified (No in S243) or determination is made that the control command as not been identified (No in S244), the home gateway 1102 instructs the sound collection device 2013 to query the user for clarification (S246).

Now, there is a possibility in the voice conversation processing that uses information of the object device identified by the object device identifying processing can reduce the risk of misrecognition. For example, if the user says "Make it warmer", this could actually have several different meanings and implications. In a case where the air conditioner has been identified, the meaning to increase the room temperature would likely yield the correct device operations. On the other hand, if a microwave oven has been selected, the meaning to warm up the food in the microwave oven would likely yield the correct device operations. If no object device has been identified, the most general and generic term possible would be better to be selected.

Simply querying the user for clarification does not guarantee that the device operation that the user desires will be performed with the user speaking an optimal number of times. For example, in a case where the user says "Turn on power", the processing should be completed by having the user to speak regarding information of the two items of device and location by querying, using the conversation dictionary 2101 illustrated in FIG. 4B. However, there is no guarantee that the user will actually state that the device is the "air conditioner" and the location is the "bedroom" in a loud and clear voice. There may be noise in the sound, the user may say unnecessary words, and the user's speech may be low and mumbling. Thus, there are many factors for recognition to fail, so ease-of use can be improved for the user by enabling device operations to be performed with minimal speech using the object device identifying processing. If excessive misrecognitions occur, measures may be taken such as presenting easy-to-understand speech examples to the user so as to reduce the rate of misrecognition, or to have some sort of a lovable character come up and apologize to the user, to alleviate the irritation of the user.

Figure 14:
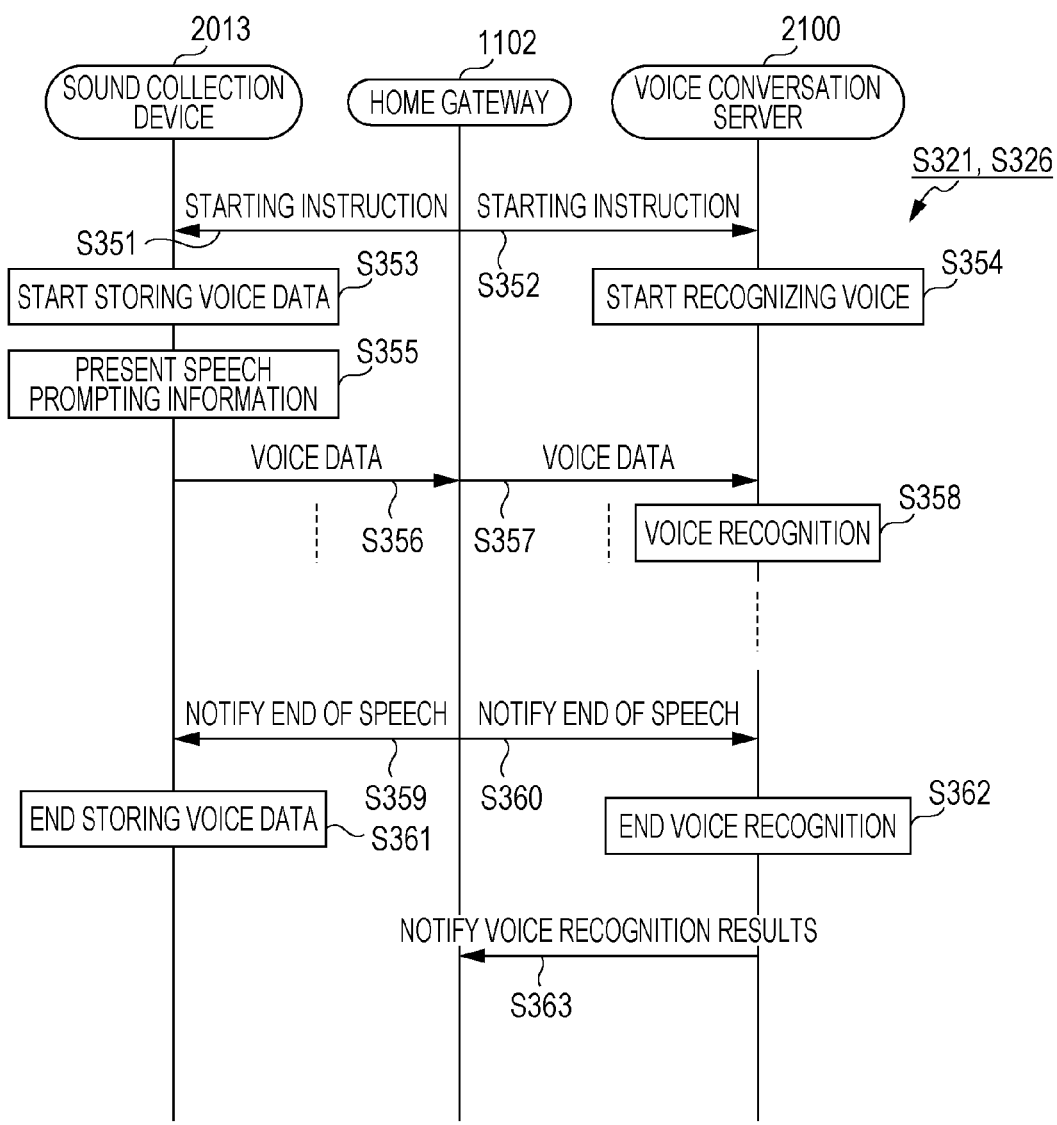
FIG. 14 is a diagram illustrating an operation example of voice recognition processing according to the first embodiment.

FIG. 14 is a diagram illustrating an example of operations of the voice recognition processing (S321 in FIG. 12). First, the home gateway 1102 instructs the sound collection device 2013 to store the sound (S351), and instructs the voice conversation server 2100 to start voice recognition (S352).

The sound collection device 2013 that has received this instruction starts saving the sound data that the user has spoken (S353). Thereafter, the sound collection device 2013 presents information to prompt the user to speak (S355). On the other hand, the voice conversation server 2100 that has received the instruction starts the voice recognition on the sound data (S354).

Next, the home gateway 1102 acquires the sound data that the sound collection device 2013 has stored (S356), and transfers the sound data to the voice conversation server 2100 (S357). The voice conversation server 2100 performs voice recognition processing on the sound data transferred thereto (S358). This series of processing is repeated until the speech of the user ends.

In a case where the speech of the user ends, the home gateway 1102 notifies the sound collection device 2013 to end storing of the sound data (S359), and notifies the voice conversation server 2100 to end the voice recognition (S360).

The sound collection device 2013 that has received the notification ends storing the sound data that the user has spoken (S361). The voice conversation server 2100 that has received the notification ends the voice recognition processing (S362), and notifies the voice recognition results to the home gateway 1102 (S363).

Figure 15:
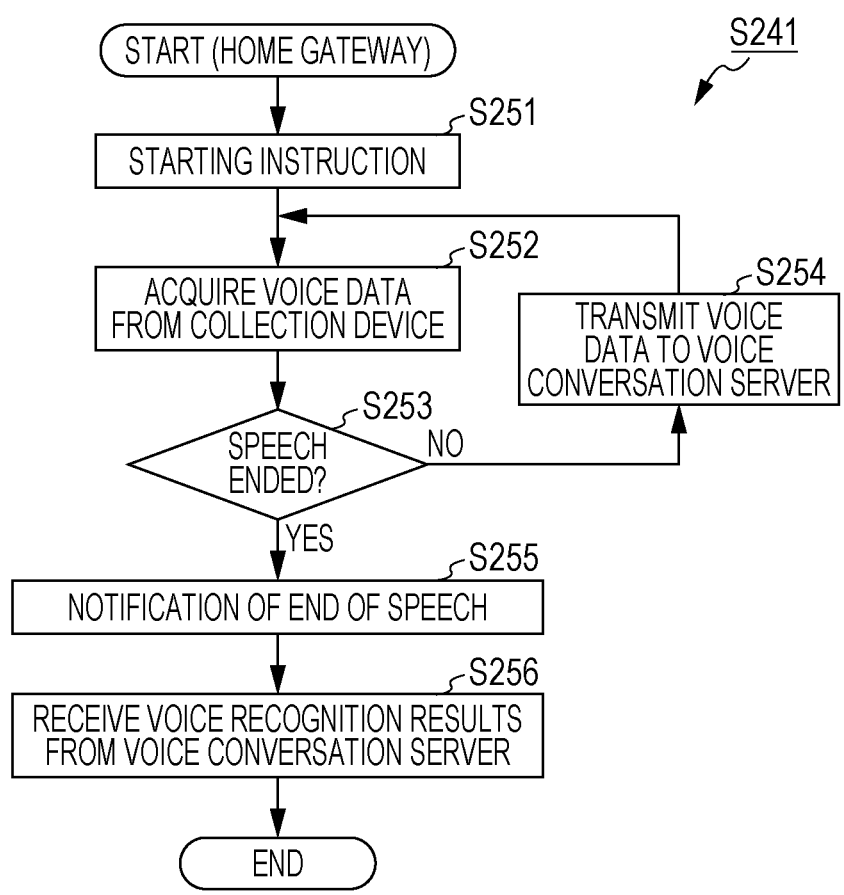
FIG. 15 is a flowchart of voice recognition processing according to the first embodiment.

FIG. 15 is a flowchart of voice recognition processing by the home gateway 1102 (S241 in FIG. 13).

First, the home gateway 1102 instructs the sound collection device 2013 to store the sound, and instructs the voice conversation server 2100 to start voice recognition (S251). Next, the home gateway 1102 acquires the sound data that the sound collection device 2013 is storing (S252). The home gateway 1102 then determines whether or not the speech of the user has ended, based on the acquired sound data (S253).

In a case where determination is made that the user is still speaking (No in S253), the home gateway 1102 transfers the sound data to the voice conversation server 2100 (S254) and the flow returns to step S252.

On the other hand, in a case where determination is made that the speech of the user has ended (Yes in S253), the home gateway 1102 notifies the sound collection device 2013 to end storing of the sound data, and notifies the voice conversation server 2100 to end the voice recognition (S255).

Next, the home gateway 1102 receives the voice recognition results transmitted from the voice conversation server 2100 (S256).

Figure 16:
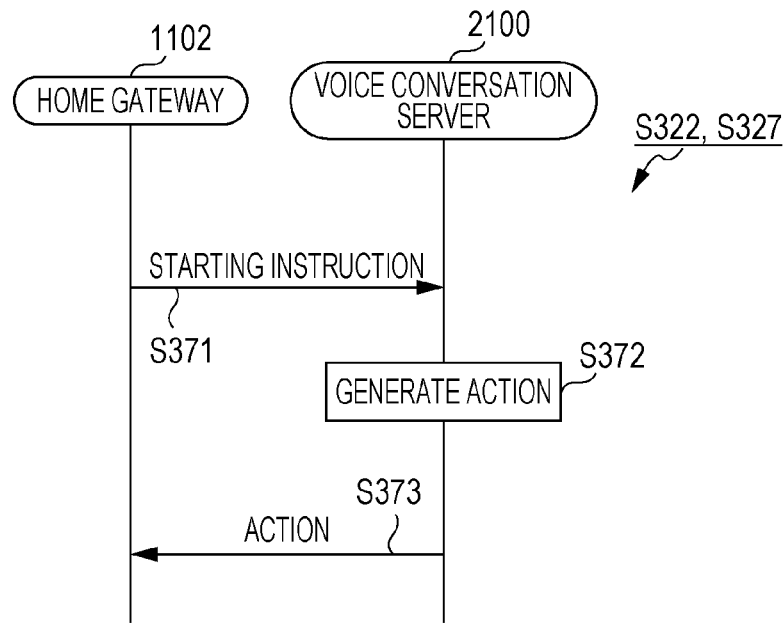
FIG. 16 is a diagram illustrating an operation example of intent understanding processing according to the first embodiment.

FIG. 16 illustrates an example of the operations of intent comprehension processing (S322 and S327 in FIG. 12). First, the home gateway 1102 instructs the voice conversation server 2100 to start intent comprehension (S371). At this time, the home gateway 1102 transmits to the voice conversation server 2100 the speech recognition text and so forth, for example, as input information.

Upon having received an instruction to start the intent comprehension, the voice conversation server 2100 matches the speech recognition text with the conversation dictionary 2101, and decides an action to instruct to the device (S372). The voice conversation server 2100 then transmits information indicating the action that has been decided, to the home gateway 1102 (S373).

Although description is made above regarding a technique to detect that the line-of-sight of the user is directed toward a region where multiple devices do not exist, in which the detection results of the line-of-sight detecting unit 2131 that the sound collection device 2013 has are used, other methods may be used. For example, line-of-sight detecting units may be provided at any other region than where the multiple devices (first device 2011 and second device 2012) are disposed.

For example, the home gateway 1102 may have a line-of-sight detecting unit. Alternatively, a line-of-sight detecting unit may be provided in an object that the user will speak to (a doll or the like). Further, the object that the user will speak to may be a virtual object (hologram, etc.). In this case, the direction of the line-of-sight of the user may be detected based on images taken by cameras disposed within the group 1100. In a case where the line-of-sight of the user is detected at none of the line-of-sight detecting units that the multiple devices have, detection may be made that the line-of-sight is directed toward a region where the multiple devices do not exist. Any of the above may be employed as techniques to detect that the line-of-sight of the user is directed toward a region where the multiple devices do not exist, or two or more techniques may be used.

As described above, the method according to the present embodiment is performed by a device deciding device (e.g., home gateway 1102 or the like) that decides object devices to be operated by the user, out of multiple devices. Note that as described above, the device deciding device is not restricted to the home gateway 1102, and may be any device included in the system. For example, the device deciding device may include at least part of the functions of the home gateway 1102, sound collection device 2013, and voice conversation server 2100, which will be described later.

First, the device deciding device acquires line-of-sight information relating to the direction in which the line-of-sight of the user is directed. The device deciding device determines whether or not the line-of-sight of the user is directed to a first region that is different from the location where the multiple devices exist and is a part of a region in a space that the user can see (S103, S231).

For example, the first region is a region where the device deciding device exists. Specifically, the device deciding device has a line-of-sight detecting unit that detects whether or not the line-of-sight of the user is directed toward the device deciding device, and acquires information to the effect that the line-of-sight of the user is directed toward the device deciding device as line-of-sight information. In a case of having detected that the line-of-sight of the user is directed toward the device deciding device, the device deciding device determines that the line-of-sight of the user is being directed toward the first region.

Alternatively, the device deciding device operates an object device based on user speech collected by the sound collection device 2013 disposed at a location different from the multiple devices, and the first region is the region where the sound collection device 2013 exists. Specifically, the sound collection device 2013 includes the line-of-sight detecting unit 2131 to detect that the line-of-sight of the user is directed toward the sound collection device 2013. The device deciding device obtains information to the effect that the line-of-sight of the user is directed toward the sound collection device 2013 as line-of-sight information. In a case of having detected that the line-of-sight of the user is directed toward the sound collection device 2013, the device deciding device determines that the line-of-sight of the user is being directed toward the first region.

Alternatively, the device deciding device operates an object device based on user speech, and the first region is a region where an object that the user will speak (talk) to (a doll or the like) exists. Specifically, the object includes a line-of-sight detecting unit to detect that the line-of-sight of the user is directed toward the object. The device deciding device obtains information to the effect that the line-of-sight of the user is directed toward the object as line-of-sight information. In a case of having detected that the line-of-sight of the user is directed toward the object, the device deciding device determines that the line-of-sight of the user is being directed toward the first region.

Alternatively, the device deciding device operates an object device based on user speech, and the first region is a region where a virtual object that the user will speak (talk) to (hologram, etc.) exists. Specifically, the device deciding device obtains images including the user that have been taken by imaging devices, as line-of-sight information. The device deciding device determines whether the line-of-sight of the user is directed toward the virtual object by analyzing the images, and in a case of determining that the line-of-sight of the user is directed toward the virtual object, determines that the line-of-sight of the user is directed toward the first region.

In a case where the line-of-sight of the user is determined to be directed toward the first region (No in S103, No in S231), the device deciding device selects, from the multiple devices, the first device existing in the space that the user cannot see, as the object device (S105, S234).

Next, the device deciding device operates the identified object device based on user operations (S108). Specifically, the device identifying device generates a command to control the object device based on the user speech contents, and transmits this command to the object device.

Alternatively, the device identifying device notifies the user of the identified object device (S106), and in a case where the identified object device has been approved by the user (Yes in S107), operates the identified object device based on user operations (S108).

Thus, according to the device identifying method according to the present embodiment, in a case where the line-of-sight of the user is directed toward a particular region other than the location where devices exist, a device existing in a space that the user cannot see is identified as the object of operation. This reduces the occurrence of queries to the user for clarification, thus improving ease-of-use for the user.

Also, the device identifying device determines whether the line-of-sight of the user is directed toward the second device included in the multiple devices, existing in the space that the user can see (S103, S231), and in a case where determination is made that the line-of-sight of the use is directed toward the second device (Yes in S103, Yes in S231), this second device is identified as the object device (S104, S232).

Thus, in the device identifying method according to the present embodiment, in a case where the line-of-sight of the user is directed toward a certain device, that device can be identified as the object of operation. This reduces the occurrence of queries to the user for clarification, thus improving ease-of-use for the user.

Also, in a case where the line-of-sight of the user is directed toward the first region, in a case where information identifying the third device included in the multiple devices is included in the user speech contents, the device identifying device identifies the third device as the object device. Also, even in a case where determination is made that the line-of-sight of the user is directed toward the first region, in a case where information identifying a particular space is included in the user speech contents, the third device in the predetermined space is identified out of the multiple devices as being the object device (Yes in S101, S102).

Accordingly, even in a case where a device has been identified as the object device based on line-of-sight information of the user, the device identified from the user speech contents is given priority as a device to be operated. Accordingly, situations where a device that the user does not intend is erroneously selected as the object of operation can be reduced.

Second Embodiment

In a second embodiment, a modification of the conversation information providing system according to the above-described first embodiment will be described. Note that in the following embodiments, redundant description with the preceding embodiments will be omitted, and description will focus primarily on different points.

The conversation information providing system according to the present embodiment differs from the conversation information providing system according to the first embodiment with regard to the point that the object device identifying processing (S222 in FIG. 10) differs. Specifically, in a case where the line-of-sight of the user is not directed toward a device, a device near the user is selected as the object device.

Figure 17:
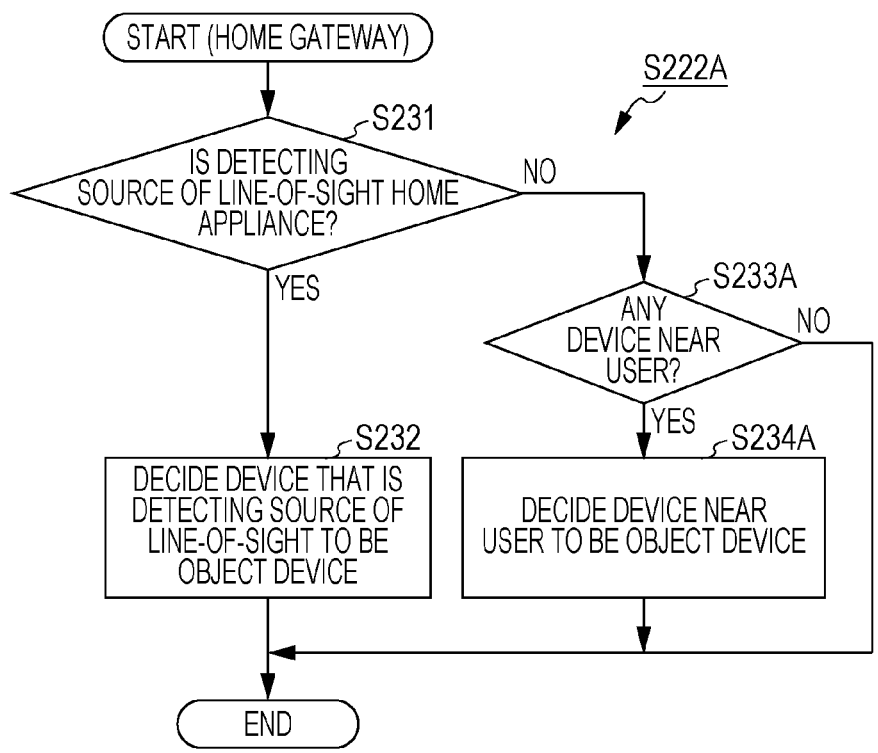
FIG. 17 is a flowchart of object device identifying processing according to a second embodiment.

FIG. 17 is a flowchart of object device identifying processing (S222A) according to the present embodiment. The processing illustrated in FIG. 17 includes steps S233A and S234A instead of steps S233 and S234 illustrated in FIG. 10.

In a case where the transmission source of the line-of-sight detection notification is not a home appliance (No in S231), the home gateway 1102 references the device management information 2142, and determines whether or not there is a device near the user (S233A). Specifically, the home gateway 1102 references the device management information 2142 and determines a device existing in the same space as a space where the user is (e.g., a room) to be a device near to the user.

In a case where a device exists near the user (Yes in S233A), the home gateway 1102 decides a device near the user to be the object device (S234A).

On the other hand, a case where no device exists near the user (No in S233A), the home gateway 1102 does not decide an individual device, and decides all devices as candidates for the object device.

In a case where all devices managed by the device management information 2142 are set as default candidates for the object device beforehand, and a device is selected in step S234A as the object device, updating may be performed so that just this device is the object device.

Figure 18:
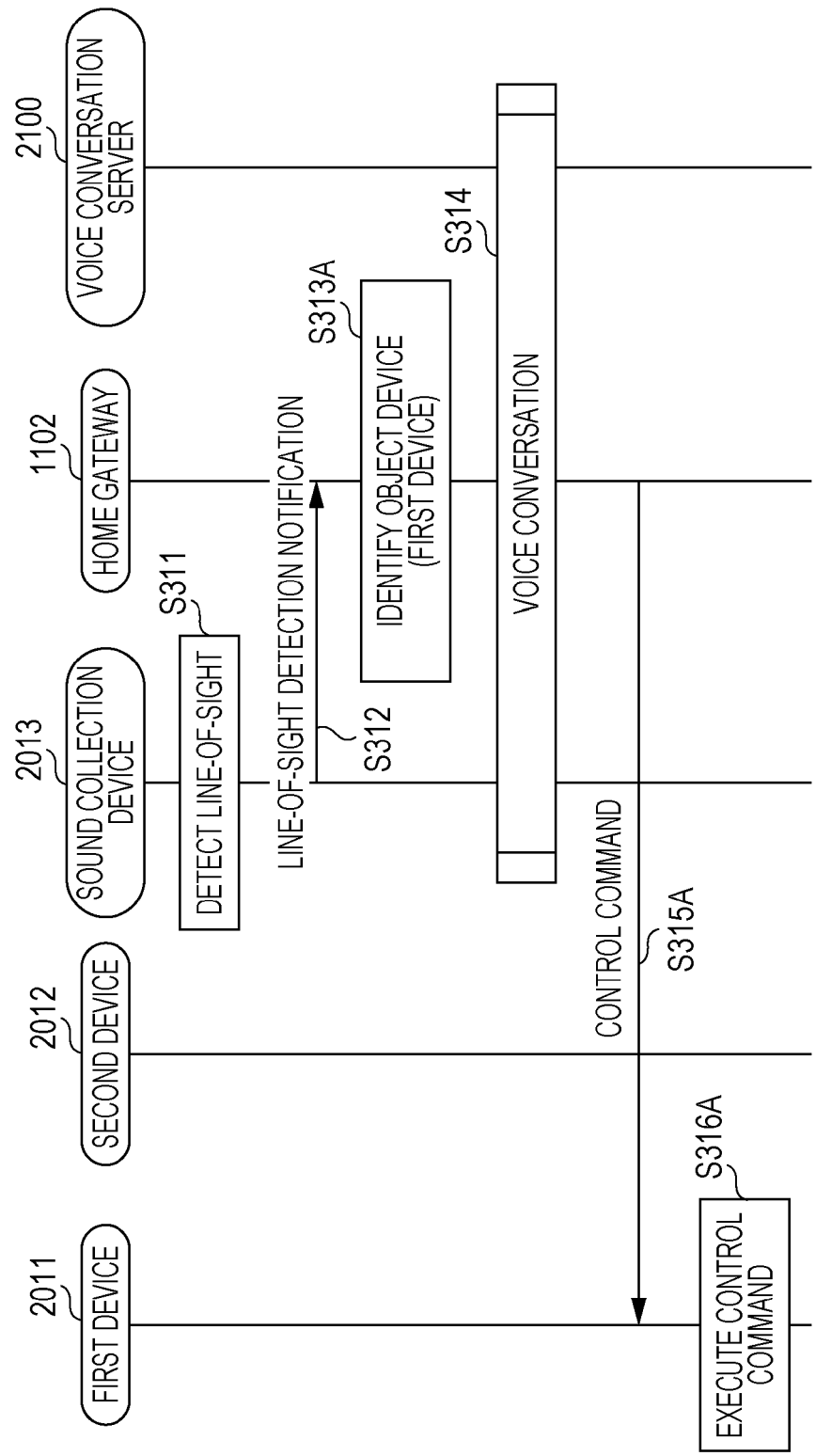
FIG. 18 is a diagram illustrating an operation example of the conversation information providing system according to the second embodiment.

FIG. 18 is a diagram illustrating an example of operations in the conversation information providing system according to the present embodiment, in a case where the user speaks to the sound collection device 2013. Note that the example of operations in the conversation information providing system in a case where the user speaks to the object device is the same as in FIG. 6.

For example, the user looks at the sound collection device 2013 and says "Turn on air conditioner". The sound collection device 2013 detects that the line-of-sight of the user is directed toward itself (S311), and notifies the home gateway 1102 (S312). The home gateway 1102 identifies the object device (S313A). In this case, the line-of-sight of the user is directed toward the sound collection device 2013, so the home gateway 1102 decides, of the first device 2011 and the second device 2012, the first device 2011 that is close to the user to be the object device. In this case, the user is in the first space 2001 (living room) and the first device 2011 that is in the same first space 2001 as the user is selected.

Next, the sound collection device 2013, the home gateway 1102, and the voice conversation server 2100 perform voice conversation processing in the same way as in step S304 (S314). The home gateway 1102 transmits a control command to the first device 2011 based on the results of the voice conversation processing (S315A). The first device 2011 receives and executes the received control command (S316A). According to this flow, the device can be identified and operated even without the user speaking content that identifies the device, by speaking to the sound collection device 2013 that is not correlated with the device.

Third Embodiment

In the present embodiment, a modification of the conversation information providing system according to the above-described first embodiment will be described. In the present embodiment, the first device 2011 and second device 2012 further have functions to detect the distance to the user. The conversation information providing system identifies devices outside of the visual range of the user, based on the distance between the devices and the user.

FIG. 19 is a block diagram illustrating an example of a first device 2011A and a second device 2012A. The first device 2011A and second device 2012A have, in addition to the components of the first device 2011 and second device 2012, distance detecting units 2114 and 2124, respectively. The distance detecting units 2114 and 2124 may detect whether or not the user is within a predetermined distance from themselves, or may detect a distance (value) between the user and themselves.

FIGS. 20A through 20C are diagrams illustrating examples of the device management information 2142 according to the present embodiment. In the example of the device management information 2142A illustrated in FIG. 20A, the home gateway 1102, the air conditioner that is the first device 2011, and the ceiling microphone that is the sound collection device 2013, are installed in the living room, and the air conditioner that is the second device 2012 is installed in the bedroom. It can be seen that the user has been detected at the first device 2011, from distance information between the user and the devices, acquired by the distance detecting units 2114 and 2124.

In the example of the device management information 2142B illustrated in FIG. 20B, the home gateway 1102, the air conditioner that is the first device 2011, the air conditioner that is the second device 2012 and the ceiling microphone that is sound collection device 2013, are provided, but where each device is installed is not set. It can be seen that the user has been detected at the first device 2011, from distance information between the user and the devices, acquired by the distance detecting units 2114 and 2124.

In the example of the device management information 2142C illustrated in FIG. 20C, the home gateway 1102 and the air conditioner that is the second device 2012, are installed in the living room, and a microwave oven that is the first device 2011 and a sound collection microphone that is the sound collection device 2013 are installed in the kitchen. It can be seen that the user has been detected at the first device 2011, from distance information between the user and the devices, acquired by the distance detecting units 2114 and 2124.

Although which device the user has been detected at is illustrated as distance information, numerical value information may be illustrated so that the degree of distance can be comprehended. Information indicating communication time with the device may be used as this numerical value information. Accordingly, which device is the closest to the user can be determined in a case where multiple devices have detected the user.

Figure 21:
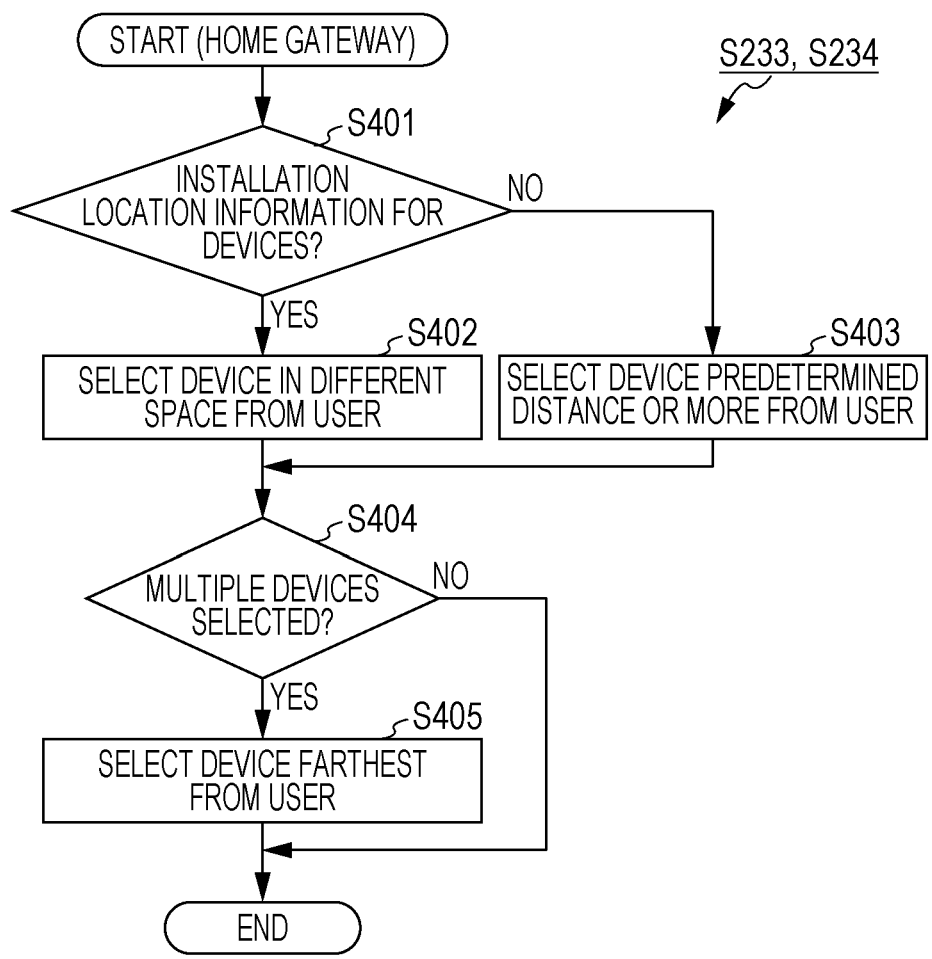
FIG. 21 is a flowchart of object device setting processing according to the third embodiment.

FIG. 21 is a flowchart illustrating the details of processing to set a device out of the viewing range of the user as the object device (S233 and S234), in the processing illustrated in FIG. 11.

First, the home gateway 1102 determines whether or not installation location information has been set in the device management information 2142 (S401). In a case where installation location information has been set (Yes in S401), the home gateway 1102 selects a device installed in a different space from the user (e.g., a different room) (S402).

On the other hand, in a case where installation location information has not been set (No in S401), the home gateway 1102 selects a device that is away from the user by a predetermined distance (S403). For example, the home gateway 1102 selects a device other than the devices that have detected the user.

In a case where multiple devices have been selected in steps S402 and S403 (Yes in S404), the home gateway 1102 selects the device farthest from the user (S405). Specific examples of this processing will be described by way of the examples in FIGS. 20A and 20B.

In the example illustrated in FIG. 20A, the first device 2011 is the air conditioner installed in the living room, the second device 2012 is the air conditioner installed in the bedroom, and the sound collection device 2013 is the microphone installed on the ceiling. In a case where the user says "Warm it up" without directing line-of-sight toward the living room devices (e.g., with the line-of-sight directed toward the sound collection device 2013), the bedroom air conditioner that is installed in a different room from the user is selected as the object device. In a case where multiple air conditioners are installed in different rooms, all of the air conditioners may be selected, of just the farthest device from the user may be selected.

In the example illustrated in FIG. 20B, there are the first device 2011 and second device 2012 in closer order from the user. The first device 2011 and the second device 2012 are air conditioners, and the sound collection device 2013 is the microphone installed on the ceiling. If the user says "Turn on cooler" without looking at the devices, operation of the air conditioner installed in the bedroom, which is the farthest from the user, starts cooling operations.

Fourth Embodiment

In a fourth embodiment of the present invention, a case of applying the same modification as in the third embodiment to the conversation information providing system according to the second embodiment will be described. The configurations of the first device 2011A, second device 2012A, and device management information 2142 are the same as in the third embodiment.

Figure 22:
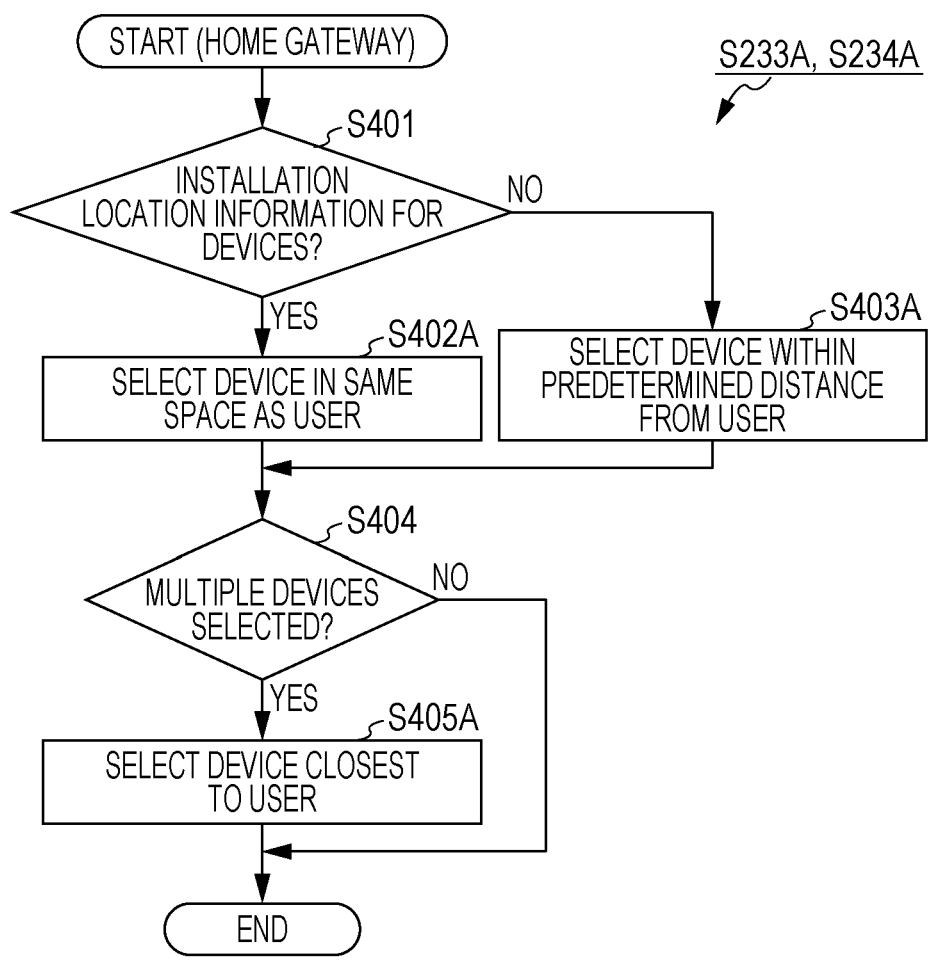
FIG. 22 is a flowchart of object device setting processing according to a fourth embodiment.

FIG. 22 is a flowchart illustrating the details of processing to set a device close to the user as the object device (S233A and S234A), in the processing illustrated in FIG. 17.

First, the home gateway 1102 determines whether or not installation location information has been set in the device management information 2142 (S401). In a case where installation location information has been set (Yes in S401), the home gateway 1102 selects a device installed in the same space from the user (e.g., the same room) (S402A).

On the other hand, in a case where installation location information has not been set (No in S401), the home gateway 1102 selects a device that is within a predetermined distance from the user, based on distance information (S403A). For example, the home gateway 1102 selects devices that have detected the user.

In a case where multiple devices have been selected, in steps S402A and S403A (Yes in S404), the home gateway 1102 selects the device closest to the user (S405A). Specific examples of this processing will be described by way of the examples in FIGS. 20A through 20C.

In the example illustrated in FIG. 20A, the first device 2011 is the air conditioner installed in the living room, the second device 2012 is the air conditioner installed in the bedroom, and the sound collection device 2013 is the microphone installed on the ceiling. In a case where the user says "Warm it up" without directing line-of-sight toward the living room devices, the living room air conditioner that is installed in the same room as the user is selected as the object device. In a case where multiple air conditioners are installed in the living room, all of the air conditioners may be selected, or just the closest device to the user may be selected.

In the example illustrated in FIG. 20B, there are the first device 2011 and second device 2012 in closer order from the user. The first device 2011 and second device 2012 are air conditioners, and the sound collection device 2013 is the microphone installed on the ceiling. If the user says "Turn on cooler" in the living room without looking at the devices, the air conditioner in the living room, which is the closest to the user, starts cooling operations. Thus, an environment more comfortable for the user can be presented.

In the example illustrated in FIG. 20C, the first device 2011 is the microwave oven installed in the kitchen, the second device 2012 is the air conditioner installed in the living room, and the sound collection device 2013 is a display device that has microphone functions, installed in the kitchen. In a case where the user is searching recipes using the display device in the kitchen, and says "Warm it up", the microwave oven that is a device of which the distance to the speaking user is within a predetermined threshold value is selected as the object device in the same way. Alternatively, once the location where the user is has been identified as the kitchen, the intent of the user can be estimated even better by giving the microwave oven, that is a device in the cooking appliance category, higher priority, instead of simply basing on distance.

Fifth Embodiment

A modification of the above-described fourth embodiment will be described in a fifth embodiment. Description will be made regarding a case where the user uses his/her own stuffed animal, avatar, or wearable microphone, to perform state confirmation or operation of home appliances by speech. Specifically, in a case where the user has spoken without looking at a device and speech has been acquired at the user's own sound collection device, a device correlated with the user (e.g., a device installed in the room of the user) is selected.

Figure 23:
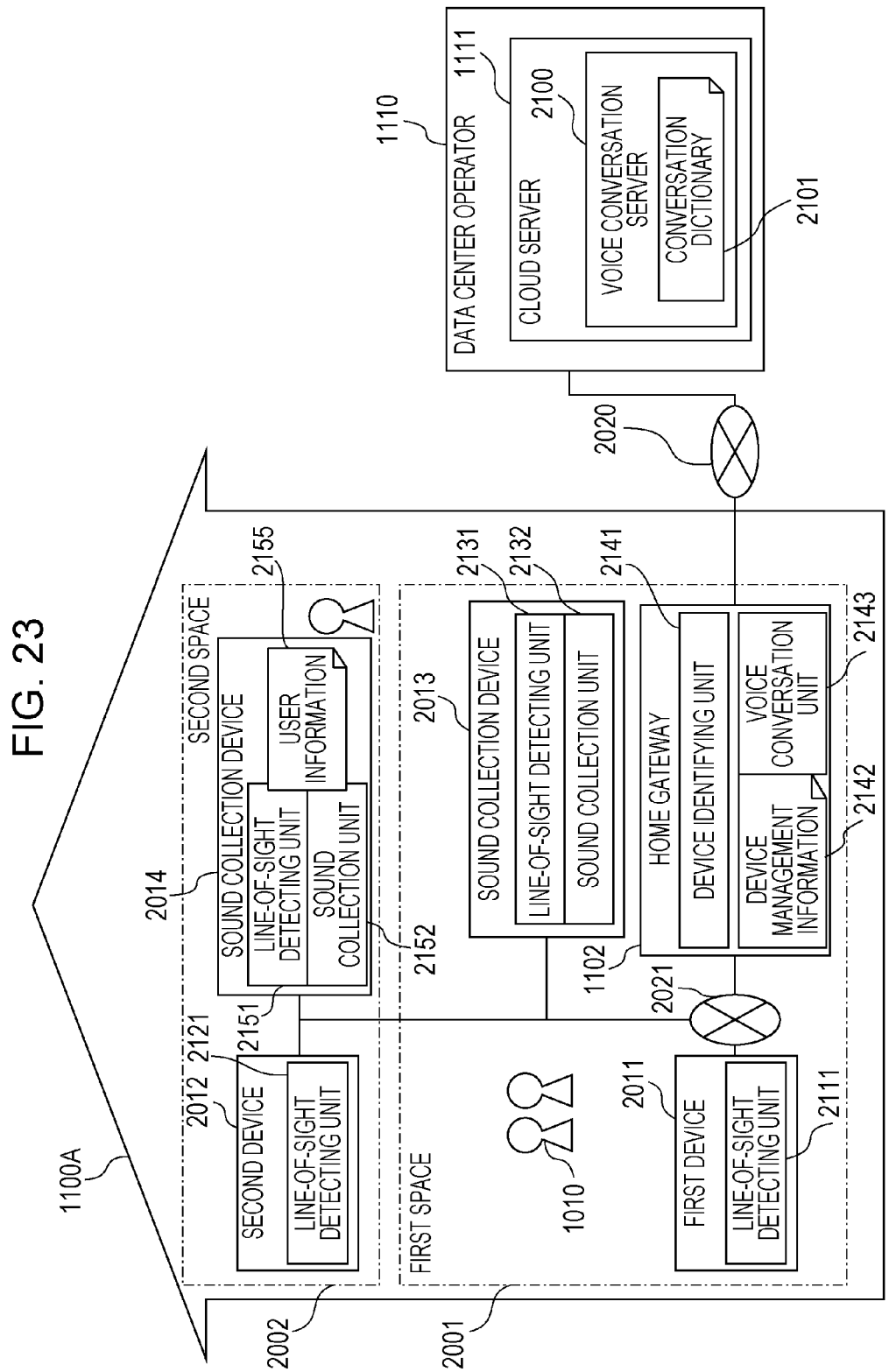
FIG. 23 is a diagram illustrating the configuration of the conversation information providing system according to a fifth embodiment.

FIG. 23 is a diagram illustrating an example of the conversation information providing system according to the present embodiment. the conversation information providing system illustrated in FIG. 23 differs from the conversation information providing system illustrated in FIG. 2 with regard to the configuration of the group 1100A. Specifically, the group 1100A further includes a sound collection device 2014. The sound collection device 2014 includes a line-of-sight detecting unit 2151 and a sound collection unit 2152. The functions of the line-of-sight detecting unit 2151 and the sound collection unit 2152 are the same as those of the line-of-sight detecting unit 2131 and sound collection unit 2132 that the sound collection device 2013 has. The sound collection device 2014 further stores user information 2155. The user information 2155 indicates a name or identifier of the user (owner) that uses the sound collection device 2013.

FIG. 24 is a diagram illustrating an example of the device management information 2142 according to the present embodiment. In the case of device management information 2142D illustrated in FIG. 24, the home gateway 1102, the air conditioner that is the first device 2011, and the ceiling microphone that is the sound collection device 2013, are installed in the living room, and the air conditioner that is the second device 2012 is installed in the child's room. The child is trying to wear the wearable microphone that is the sound collection device 2014 and talk.

Figure 25:
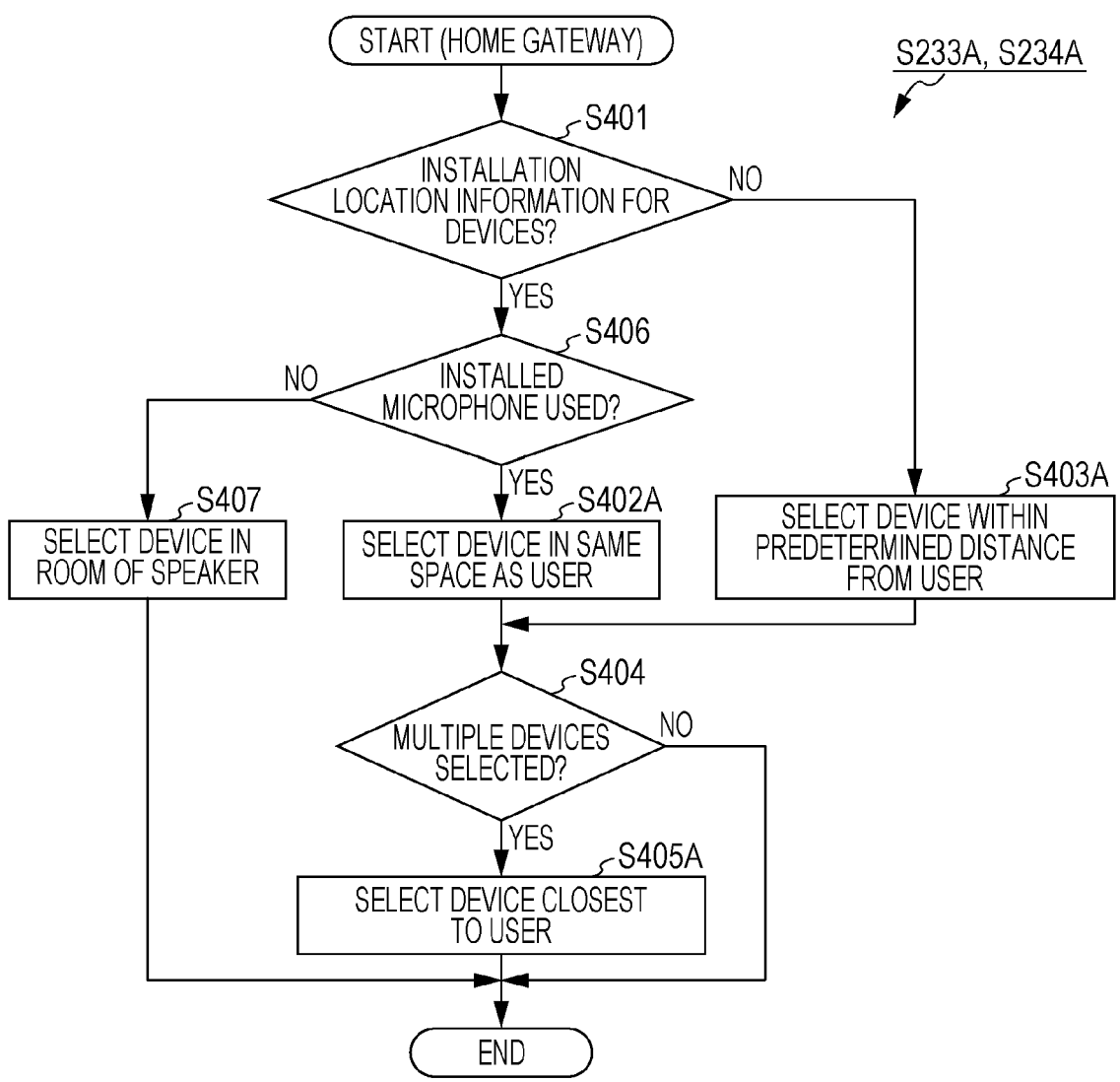
FIG. 25 is a flowchart of object device setting processing according to the fifth embodiment.

FIG. 25 is a flowchart illustrating the details of setting a device near to the user as the object device (S233A and S234A in FIG. 17). The processing illustrated in FIG. 25 is the processing illustrated in FIG. 22 to which steps S406 and S407 have been added.

In a case where the installation location information has been set (Yes in S401), the home gateway 1102 determines whether or not the user has spoken using an installed microphone of which the installation location is fixed, like the ceiling microphone (S406). In a case where the user has spoken using an installed microphone (Yes in S406), the processing of step S402A and thereafter is performed, in the same way as in the fourth embodiment.

On the other hand, in a case where the user has not used the installed microphone, i.e., in a case where speech has been made using the portable microphone such as the wearable microphone correlated with that user (No in S406), the home gateway 1102 selects the device installed in the room of the user (S407). A specific example of this processing will be described by way of the example in FIG. 24.

In the example in FIG. 24, the first device 2011 is the air conditioner installed in the living room, the second device 2012 is the air conditioner installed in the room of the user, and the sound collection device 2014 is the wearable microphone for the user. In a case where the user says "warm it up" using the wearable microphone in the living room, the second device 2012 installed in the room of the user is selected. Thus, the device can be identified and controlled even in a case of the user's speech not identifying the device, such as "Warm it up".

Note that priority may be set for the users. Accordingly, in a case where multiple users speak at the same time, the speech of the user that has higher priority is given priority. For example, the priority of adults in the family may be set higher than children. Alternatively, the priority of family members may be set high, and the priority of unregistered users such as guests may be set low.

Although the operations of the present embodiment have been described as a modification of the fourth embodiment, the same modification can be applied to other embodiments as well.

As described above, the device identifying device operates an object device based on speech of the user collected by one of multiple sound collection devices 2013 and 2014. The multiple sound collection devices 2013 and 2014 include a first sound collection device 2014 correlated with a user beforehand. In a case where user speech has been collected by the first sound collection device 2014, the device identifying device identifies the device correlated with the user, out of the multiple devices (first device 2011 and second device 2012). Accordingly, a device correlated with a user can be given priority as an object device. Thus, a situation where a device not intended by the user is erroneously selected as the object of operation can be prevented.

Sixth Embodiment

A modification of the above-described first embodiment will be described in a sixth embodiment. In the present embodiment, the conversation information providing system prompts the user to explicitly instruct which device is to be operated, at the time of collecting sound. Specifically, the conversation information providing system prompts the user to face the direction of the object device.

Figure 26:
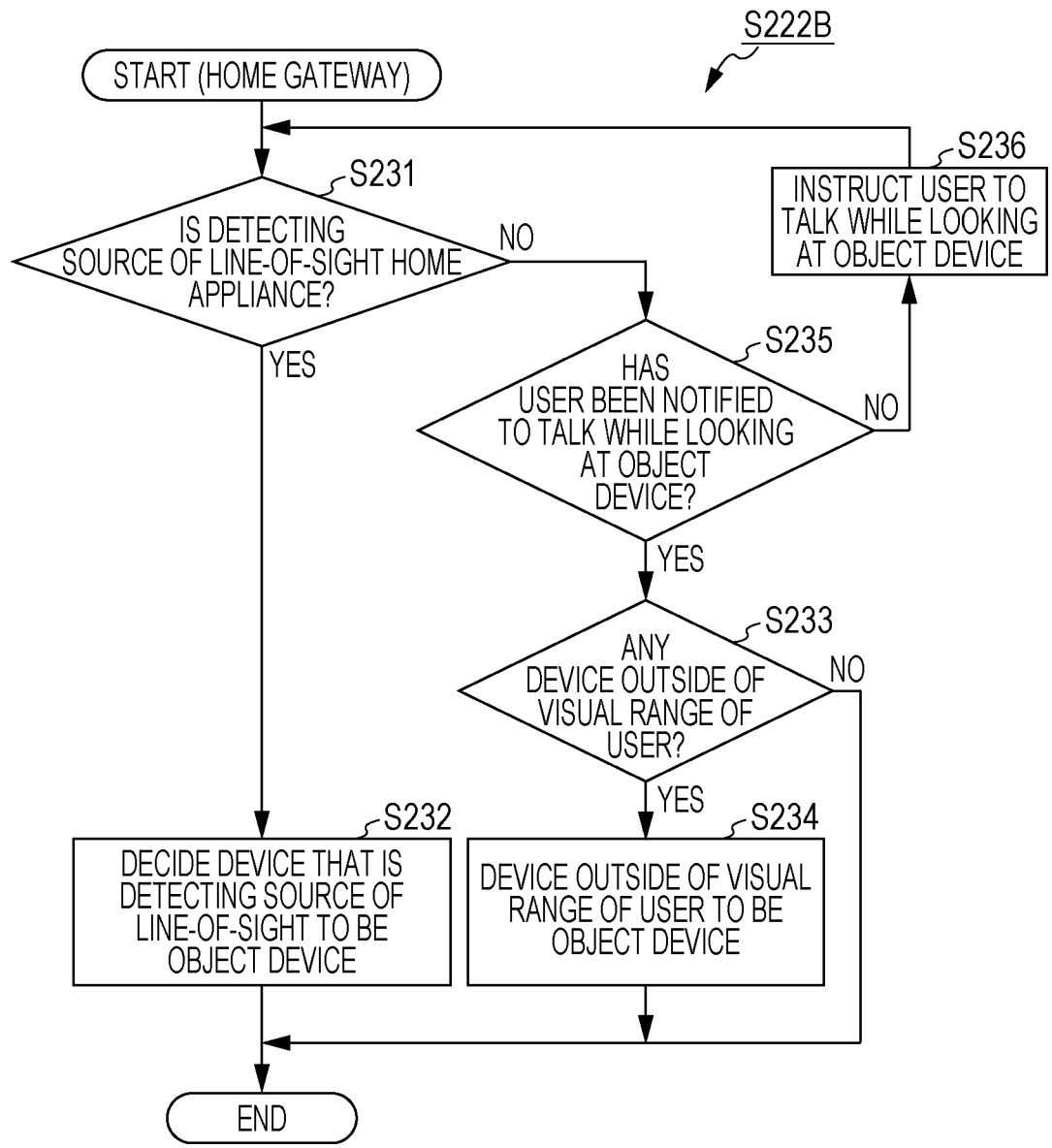
FIG. 26 is a flowchart of object device setting processing according to the sixth embodiment.

FIG. 26 is a flowchart of a modification (S222B) of object device identifying processing (S222). The processing illustrated in FIG. 26 is the processing in FIG. 11 to which steps S235 and S236 have been added.

In a case where the transmission source of the line-of-sight detection notification is not a home appliance (No in S231), the home gateway 1102 determines whether or not a notification has been made to the user to speak while looking at the object device (S235). In a case where this notification has not been made (No in S235), the home gateway 1102 instructs the sound collection device 2013 or the like that has capabilities to present information to the user, to give a message to the user (S236). An example of the message is "Please face the device you want to operate, and speak", or the like. Thus, the device that the user wants to operate can be identified more clearly.

Other Modifications

The technology described in the above embodiments can also be realized by the following configurations, for example.

Figure 27:
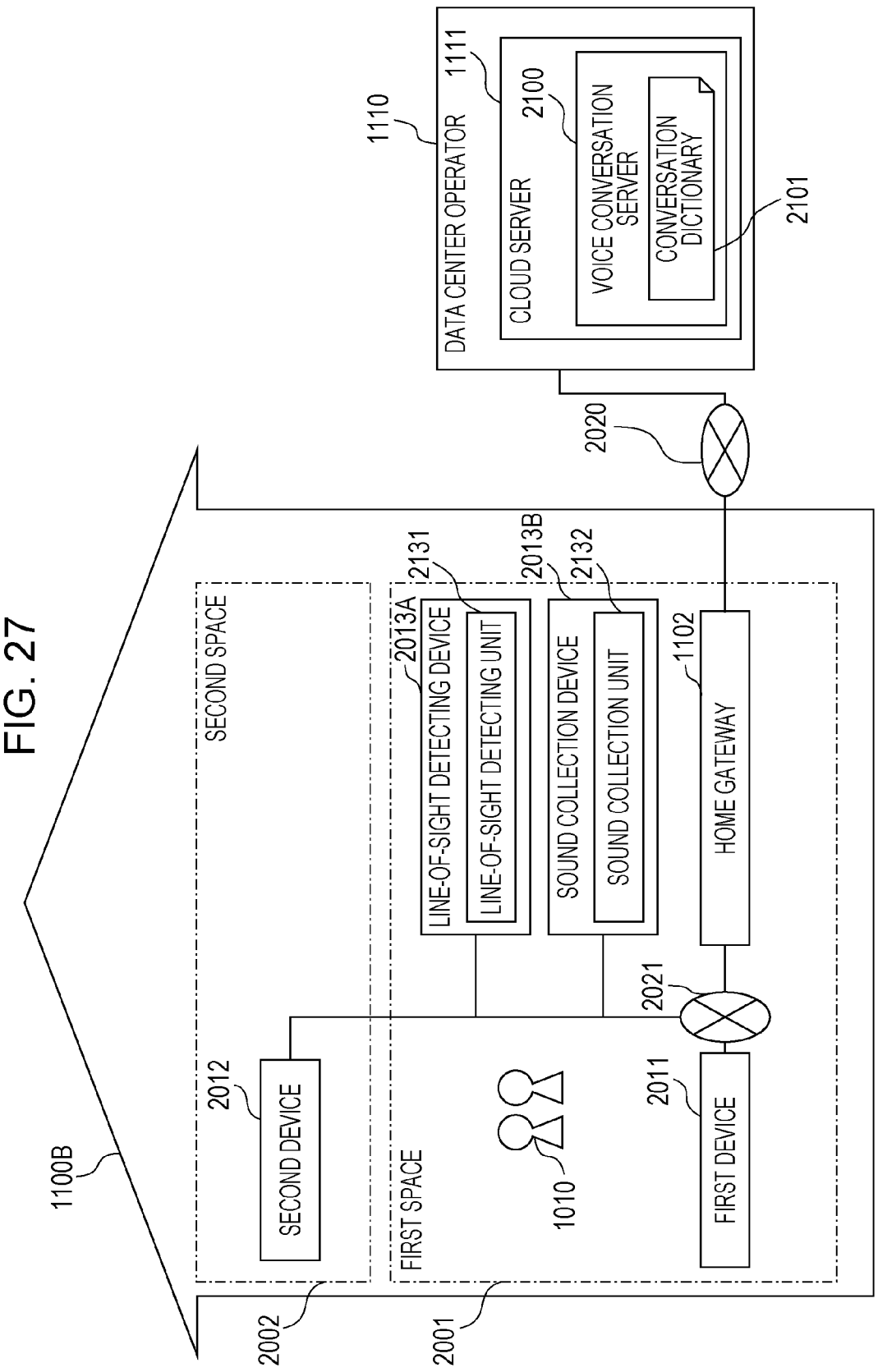
FIG. 27 is a diagram illustrating the configuration of a modification of the conversation information providing system.

In FIG. 27, the line-of-sight detecting unit 2131 and the sound collection unit 2132 are separated into different devices. That is to say, a group 11006 in FIG. 27 has a sound collection device 2013A including the line-of-sight detecting unit 2131, and a sound collection device 20136 including the sound collection unit 2132. This configuration not only enables the unit cost of the device to be reduced, but also makes the device smaller and lighter, so the device is more readily carried. Accordingly, the precision of line-of-sight detection can be improved.

Figure 28:
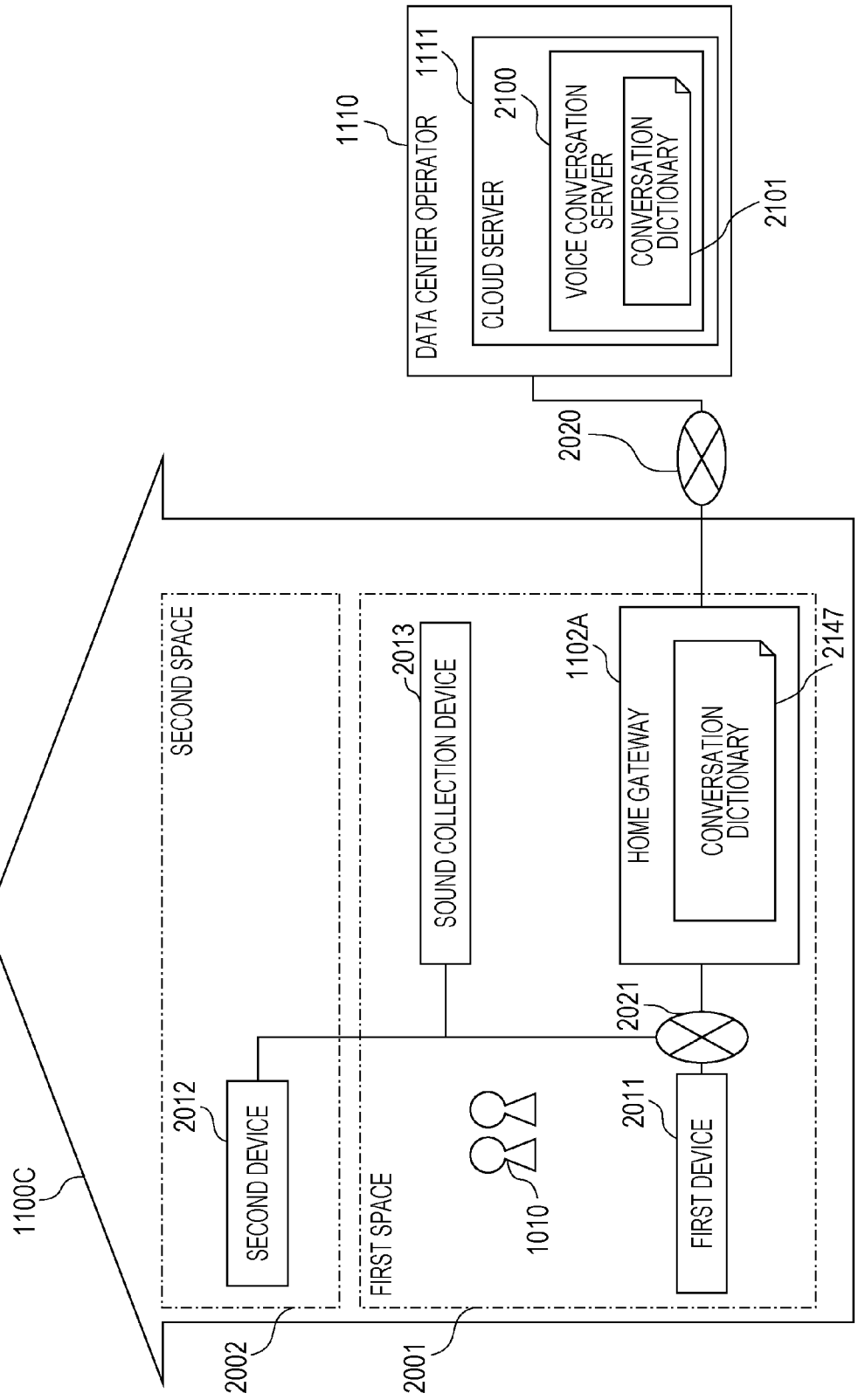
FIG. 28 is a diagram illustrating the configuration of a modification of the conversation information providing system.

A home gateway 1102A of a group 1100C illustrated in FIG. 28 has a conversation dictionary 2147. According to such a configuration, device control can be performed even in a case where radio waves are poor or a LAN cable has come loose or the like, and communication has been cut off. Also, overhead due to communication can be reduced even which communication is working, thereby improving responsivity.

Note that in this case, both the home gateway 1102A and the voice conversation server 2100 may perform intent comprehension processing. In this case, there may be difference occurring between the conversation dictionary 2147 that the home gateway 1102A stores, and the conversation dictionary 2101 that the voice conversation server 2100 stores, so the desired results may be obtained only at one side.

Figure 29:
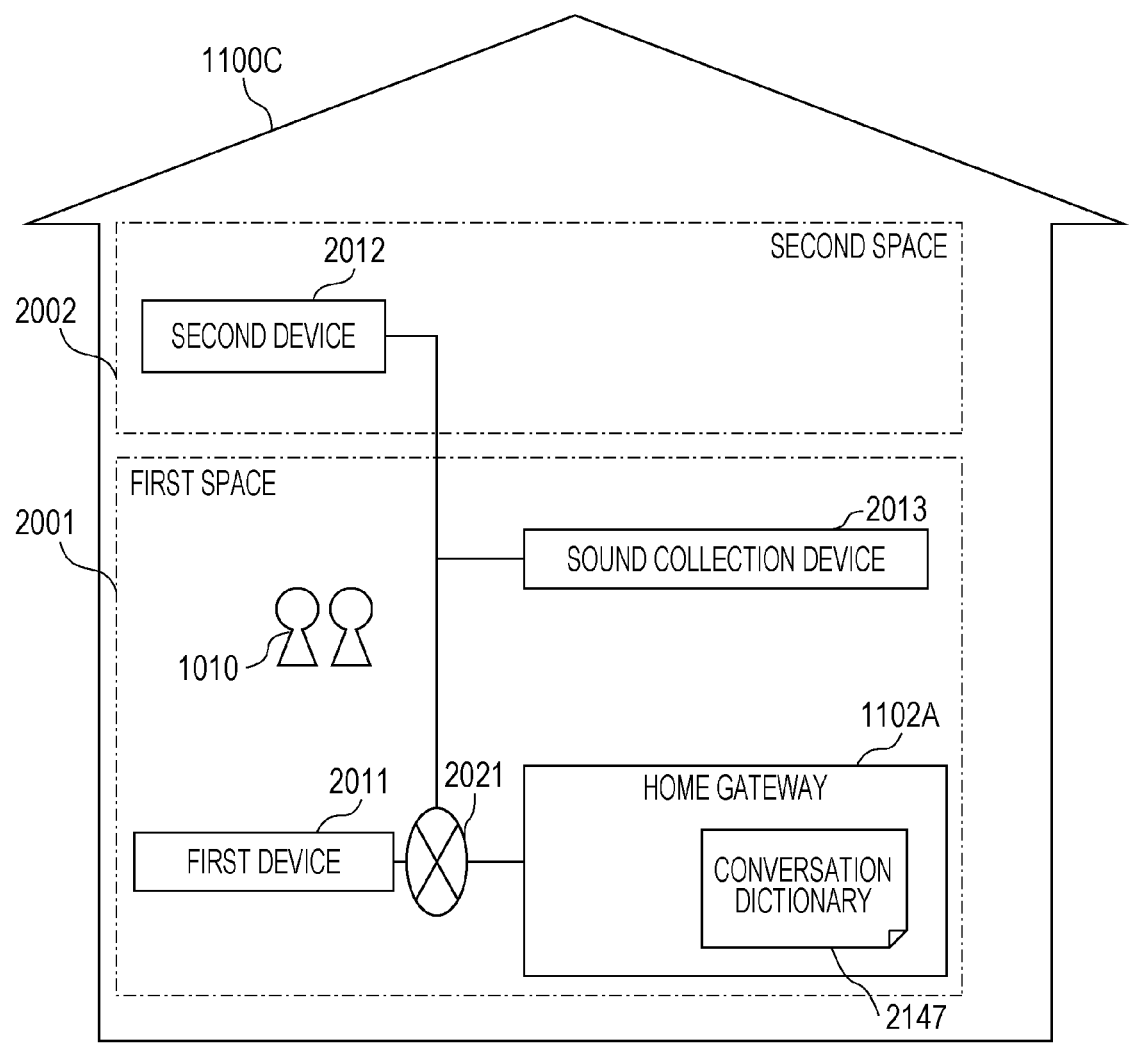
FIG. 29 is a diagram illustrating the configuration of a modification of the conversation information providing system.

In the example illustrated in FIG. 29, the conversation dictionary 2147 is stored at the home gateway 1102A, and there is no voice conversation server 2100. According to such a configuration, device control can be realized by speech even in an environment where there is no Internet connection.

Figure 30:
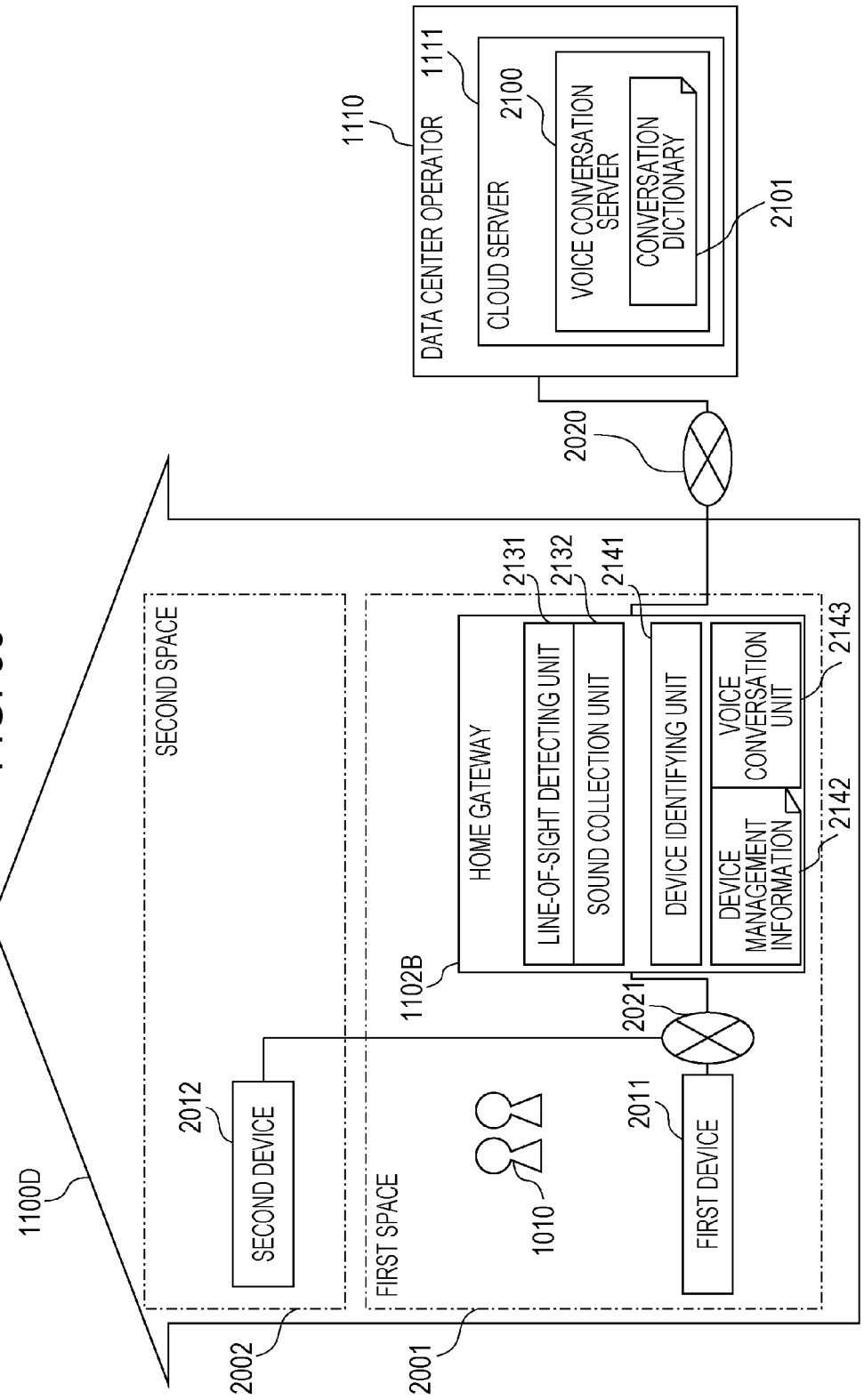
FIG. 30 is a diagram illustrating the configuration of a modification of the conversation information providing system.

In a group 1100D illustrated in FIG. 30, the home gateway 1102 and sound collection device 2013 are integrated. A home gateway 1102B included in the group 1100D has the line-of-sight detecting unit 2131 and the sound collection unit 2132. According to this configuration, there is no need for inter-device communication at the time of line-of-sight detection, so overhead due to communication is reduced, and responsivity to the user can be improved.

The technology described above in all of the embodiments may be realized by the following types of cloud service. However, the type of cloud service by which the above technology described in the above embodiments can be realized is not restricted to these.

Service Type 1: In-House Data Center Type Cloud Service

Figure 31:
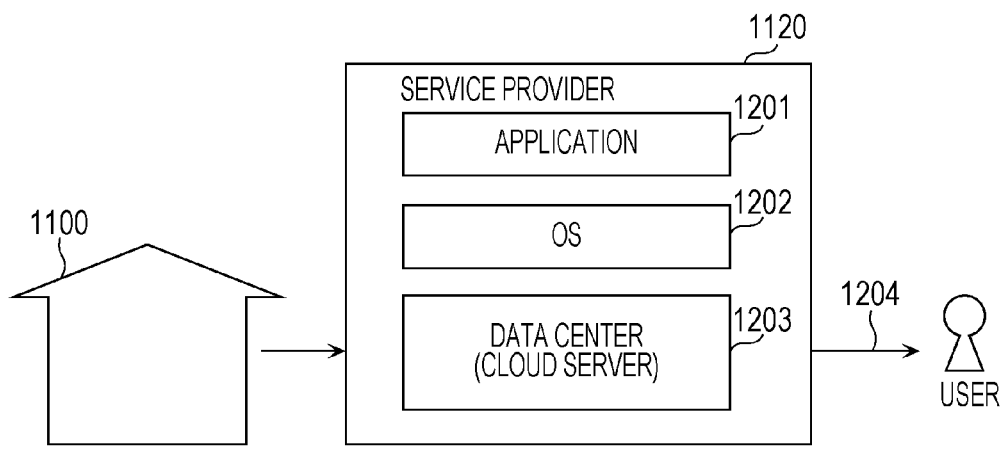
FIG. 31 is a diagram illustrating an overall image of service provided by an information managing system according to a type 1 service (in-house data center type cloud service)

FIG. 31 is a diagram illustrating the overall image of services which the information managing system provides in a service type 1 (in-house data center type cloud service). This type is a type where a service provider 1120 obtains information from a group 1100, and provides a user with service. In this type, the service provider 1120 functions as a data center operator. That is to say, the service provider 1120 has a cloud server 1111 to manage big data. Accordingly, the data center operator does not exist.

In this type, the service provider 1120 operates and manages the data center (cloud server) 1203. The service provider 1120 also manages operating system (OS) 1202 and applications 1201. The service provider 1120 provides services (arrow 1204) using the OS 1202 and applications 1201 managed by the service provider 1120.

Service Type 2: IaaS Usage Type Cloud Service

Figure 32:
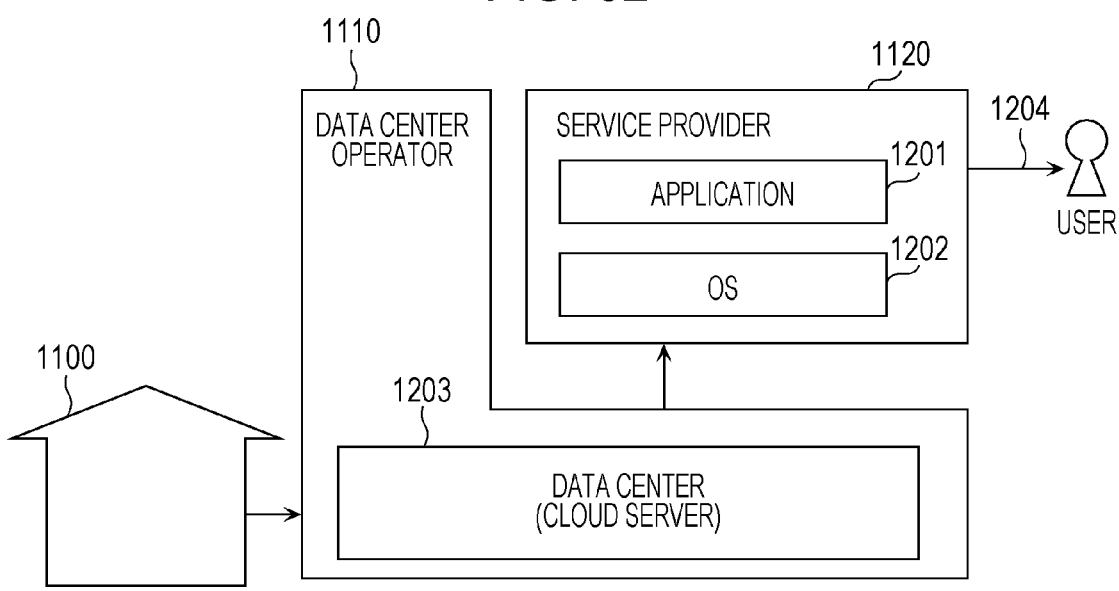
FIG. 32 is a diagram illustrating an overall image of service provided by an information managing system according to a type 2 service (IaaS usage type cloud service)

FIG. 32 is a diagram illustrating the overall image of services which the information managing system provides in a service type 2 (IaaS usage type cloud service). IaaS stands for "Infrastructure as a Service", and is a cloud service providing model where the base for computer system architecture and operation itself is provided as an Internet-based service.

In this type, the data center operator 1110 operates and manages the data center 1203 (cloud server). The service provider 1120 manages the OS 1202 and applications 1201. The service provider 1120 provides services (arrow 1204) using the OS 1202 and applications 1201 managed by the service provider 1120.

Service Type 3: PaaS Usage Type Cloud Service

FIG. 33 is a diagram illustrating the overall image of services which the information providing system provides in a service type 3 (PaaS usage type cloud service). PaaS stands for "Platform as a Service", and is a cloud service providing model where a platform serving as the foundation for software architecture and operation is provided as an Internet-based service.

In this type, the data center operator 1110 manages the OS 1202 and operates and manages the data center 1203 (cloud server). The service provider 1120 also manages the applications 1201. The service provider 1120 provides services (arrow 1204) using the OS 1202 managed by the data center operator 1110 and applications 1201 managed by the service provider 1120.

Service Type 4: SaaS Usage Type Cloud Service

FIG. 34 is a diagram illustrating the overall image of services which the information providing system provides in a service type 4 (SaaS usage type cloud service). SaaS stands for "Software as a Service". A SaaS usage type cloud service is a cloud service providing model having functions where corporations or individuals who do not have a data center (cloud server) can use applications provided by a platform provider having a data center (cloud server) for example, over a network such as the Internet.

In this type, the data center operator 1110 manages the applications 1201, manages the OS 1202, and operates and manages the data center 1203 (cloud server). The service provider 1120 provides services (arrow 1204) using the OS 1202 and applications 1201 managed by the data center operator 1110.

In each of these types, the service provider 1120 performs the act of providing services. The service provider or data center operator may develop the OS, applications, database for big data, and so forth, in-house, or may commission this to a third party, for example.

Although the conversation information providing system according to embodiments of the present disclosure has been described, the disclosure is not restricted to the embodiments.

Part or all of the components included in the conversation information providing system according to the above embodiments are typically realized as a Large Scale Integration (LSI) which is an integrated circuit. These may be individually formed into one chip, or part or all may be included in one chip.

The circuit integration is not restricted to LSIs, and dedicated circuits or general-purpose processors may be used to realize the same. A Field Programmable Gate Array (FPGA) which can be programmed after manufacturing the LSI, or a reconfigurable processor where circuit cell connections and settings within the LSI can be reconfigured, may be used.

Note that in the above-described embodiments, the components may be realized as a dedicated hardware configuration, or may be realized by executing a software program suitable for the components. The components may be realized by a program executing unit such as a central processing unit (CPU) or like processor reading out and executing a software program recorded in a recording medium such as a hard disk or semiconductor memory or the like.

Further, the present disclosure may be the above program, or as a non-transitory computer-readable recording medium storing the program. It is needless to say that the above computer program may be distributed by way of a transmission media such as the Internet.

The divisions of functional blocks in the block drawings are exemplary, and multiple functional blocks may be realized as a single functional block, a single functional block may be divided into multiple functional blocks, and part of a functional block may be transferred to another functional block. Also, the functions of multiple functional blocks having similar functions may be processed in parallel or time-division by a single hardware or software arrangement.

The order in which the multiple steps illustrated in the above flowcharts are executed have been exemplarily illustrated to specifically described the present disclosure, and orders other than those above may be used. For example, part of the above steps may be performed at the same time (in parallel) with other steps.

Although the conversation information providing system according to one or more aspects has been described by way of embodiments, the present disclosure is not restricted to these embodiments. Modifications conceivable by one skilled in the art, and combinations of components from different embodiments, may also be made within the scope of the conversation information providing system according to one or more aspects, without departing from the essence of the present disclosure.

The present disclosure is useful in a device control system where multiple devices are operated by user speech, and a home gateway connected to multiple devices.

What is claimed is:

1. A device control method of a controller connected to a first device, a second device, a camera, and a microphone,
   the first device being installed at a first location in a first space,
   the second device being installed at a second location in a second space which is not overlapped with the first space,
   the camera detecting a line-of-sight direction of a user,
   the microphone detecting speech of the user,
   the first space being visible to the user, and
   the second space not being visible to the user,
   the device control method comprising:
      acquiring sound data indicating the detected speech of the user from the microphone;
      determining whether the detected speech of the user includes a phrase indicating the first device or the second device;
      acquiring, from the camera, line-of-sight information indicating the line-of-sight direction of the user when it is determined that the speech does not include the phrase;
      determining whether the line-of-sight direction of the user indicates a third location other than the first location in the first space, based on the line-of-sight information;
      identifying, in a case where the line-of-sight direction of the user is determined to indicate the third location, the second device as an object of control;
      generating a control command corresponding to the sound data; and
      transmitting the control command to the object of control.

2. The device control method according to claim 1, further comprising:
   determining whether the line-of-sight direction of the user indicates the first location, based on the line-of-sight information; and
   identifying, in a case where the line-of-sight direction of the user is determined to indicate the first location, the first device as the object of control.

3. The device control method according to claim 1,
   wherein the third location is where the controller is installed.

4. The device control method according to claim 1,
   wherein the controller is provided with the camera.

5. The device control method according to claim 1,
   wherein the third location is where the microphone is installed.

6. The device control method according to claim 1,
   wherein the microphone is provided with the camera.

7. The device control method according to claim 1,
   wherein an object is disposed in the first space,
   and wherein the third location is where the object is disposed.

8. The device control method according to claim 7,
   wherein the object is provided with the camera.

9. The device control method according to claim 7,
   wherein the object includes a doll.

10. The device control method according to claim 1,
    wherein a virtual object is projected in the first space, and wherein the third location is where the virtual object is projected.

11. The device control method according to claim 10, wherein the virtual object includes one of an avatar and a hologram.

12. The device control method according to claim 1, further comprising:
notifying the user of the object of control.

13. The device control method according to claim 1,
wherein a third device is installed in the first space,
wherein the sound data is analyzed,
and wherein, in a case where a determination is made that the sound data indicating the speech indicates the third device, the third device is identified as the object of control.

14. The device control method according to claim 1,
wherein the first space includes a third space,
wherein a third device is installed in the third space,
wherein the sound data is analyzed,
and wherein, in a case where a determination is made that the sound data indicating the speech indicates the third space, the third device is identified as the object of control.

15. The device control method according to claim 1,
wherein the microphone is a plurality of microphones,
and wherein, in a case where the sound data is acquired from a first microphone of the plurality of microphones, the one of the first device and second device that has been correlated with the first microphone beforehand is identified as the object of control.

16. The device control method according to claim 1,
wherein the controller includes memory,
wherein the memory stores a correlation between the sound data and the control command corresponding to the sound data,
and wherein the control command is generated based on the correlation.

17. The device control method according to claim 1,
wherein the controller is connected to a server,
wherein the server stores a correlation between the sound data and the control command corresponding to the sound data,
wherein the correlation is acquired from the server,
and wherein the control command is generated based on the correlation.

18. A non-transitory computer-readable recording medium storing a program that causes a computer to execute the device control method according to claim 1.

19. A controller connected to a first device, a second device, a camera, and a microphone,
wherein the first device is installed at a first location in a first space,
wherein the second device is installed at a second location in a second space which is not overlapped with the first space,
wherein the camera detects a line-of-sight direction of a user,
wherein the microphone detects speech of the user,
wherein the first space is visible to the user,
wherein the second space is not visible to the user,
and wherein the controller
acquires sound data indicating the detected speech of the user from the microphone,
determines whether the detected speech of the user includes a phrase indicating the first device or the second device,
acquires, from the camera, line-of-sight information indicating the line-of-sight direction of the user when it is determined that the speech does not include the phrase,
determines whether the line-of-sight direction of the user indicates a third location other than the first location in the first space, based on the line-of-sight information,
identifies, in a case where the line-of-sight direction of the user is determined to indicate the third location, the second device as an object of control,
generates a control command corresponding to the sound data, and
transmits the control command to the object of control.

* * * * *